United States Patent
Mueller

(10) Patent No.: US 8,992,838 B1
(45) Date of Patent: Mar. 31, 2015

(54) HYDROCARBON VAPOR RECOVERY SYSTEM

(75) Inventor: Hans Peter Mueller, Centennial, CO (US)

(73) Assignee: EcoVapor Recovery Systems, LLC, Denver, CO (US)

(*) Notice: Subject to any disclaimer, the term of this patent is extended or adjusted under 35 U.S.C. 154(b) by 450 days.

(21) Appl. No.: 13/365,247

(22) Filed: Feb. 2, 2012

Related U.S. Application Data

(60) Provisional application No. 61/438,834, filed on Feb. 2, 2011, provisional application No. 61/451,557, filed on Mar. 10, 2011, provisional application No. 61/570,700, filed on Dec. 14, 2011.

(51) Int. Cl.
*B01J 19/00* (2006.01)
*B01J 19/24* (2006.01)
*B01D 3/00* (2006.01)
*C10G 7/00* (2006.01)

(52) U.S. Cl.
CPC .................................. *B01D 53/146* (2013.01)
USPC ........................................................ 422/129

(58) Field of Classification Search
CPC ............ B01J 19/00; B01J 19/24; B01D 3/00; B01D 3/40; C10G 7/00; C10G 7/08; C10G 7/12; E21B 43/00; E21B 43/34; E21B 43/40; F25J 5/00
USPC ................................................ 422/129, 187
See application file for complete search history.

(56) References Cited

U.S. PATENT DOCUMENTS

| | | | |
|---|---|---|---|
| 1,653,387 A | 8/1924 | Brown | |
| 2,126,367 A | 6/1936 | Clawson et al. | |
| 2,947,379 A | 4/1958 | Aubrey | |
| 3,331,194 A | 7/1967 | Reed et al. | |
| 3,707,157 A | 12/1972 | Tipton et al. | |
| 4,273,189 A | 6/1981 | Carpenter | |
| 4,422,301 A | 12/1983 | Watt et al. | |
| 4,579,565 A | 4/1986 | Heath | |
| 4,747,853 A | 5/1988 | Haslett et al. | |
| 5,132,011 A | 7/1992 | Ferris | |

(Continued)

FOREIGN PATENT DOCUMENTS

| | | |
|---|---|---|
| JP | 08034497 | 2/1996 |
| WO | WO 2005/045173 | 5/2005 |

OTHER PUBLICATIONS

Portable Vapor Bladders, R.A. Nichols Engineering (www.raneng.com), downloaded Nov. 7, 2014, 2 pages.

(Continued)

*Primary Examiner* — Natasha Young
(74) *Attorney, Agent, or Firm* — Brownstein Hyatt Farber Schrenk, LLP

(57) ABSTRACT

Disclosed herein is a system for recovering flash gas from an oil storage tank. In one example of the invention, the system may include a flexible storage tank that receives the flash gas and temporarily stores the flash gas; a compressor having an input receiving the flash gas from the flexible storage tank, the compressor compressing the flash gas to form compressed gas; and an oxygen reduction subsystem receiving the compressed gas, the oxygen reduction subsystem reducing an amount of oxygen from the compressed gas. In this manner, the resulting compressed oxygen-reduced gas that has been recovered can be injected into a sales gas line for use, under certain conditions.

19 Claims, 13 Drawing Sheets

(56) References Cited

U.S. PATENT DOCUMENTS

| | | |
|---|---|---|
| 5,135,360 A | 8/1992 | Anderson et al. |
| 5,139,390 A | 8/1992 | Rajewski |
| 5,149,344 A | 9/1992 | Macy |
| 5,195,587 A | 3/1993 | Webb |
| 5,249,593 A | 10/1993 | Higgins et al. |
| 5,524,456 A | 6/1996 | Stokes |
| 5,651,389 A | 7/1997 | Anderson |
| 5,775,442 A | 7/1998 | Speed |
| 5,900,137 A | 5/1999 | Homan |
| 5,979,481 A | 11/1999 | Ayresman |
| 6,209,651 B1 | 4/2001 | Knight |
| 6,363,959 B1 | 4/2002 | Ollivier |
| 6,422,313 B1 | 7/2002 | Knight |
| 6,527,002 B1 | 3/2003 | Szakaly |
| 6,681,789 B1 | 1/2004 | Moulis et al. |
| 6,881,329 B2 | 4/2005 | Amado et al. |
| 6,955,704 B1 | 10/2005 | Strahan |
| 7,069,942 B2 | 7/2006 | Trefall et al. |
| 7,350,581 B2 | 4/2008 | Wynn |
| 7,504,037 B2 | 3/2009 | Gibbs |
| 7,749,308 B2 | 7/2010 | McCully |
| 7,766,031 B2 | 8/2010 | Platusich et al. |
| 8,133,300 B1 * | 3/2012 | Gonsalves et al. ............... 95/19 |
| 8,206,124 B1 * | 6/2012 | Varani et al. .................... 417/34 |
| 8,475,966 B2 | 7/2013 | Knight et al. |
| 8,529,215 B2 | 9/2013 | Heath et al. |
| 2003/0183394 A1 | 10/2003 | Reitz |
| 2005/0051503 A1 | 3/2005 | Holland et al. |
| 2006/0144080 A1 | 7/2006 | Heath et al. |
| 2008/0202593 A1 | 8/2008 | Allard et al. |
| 2010/0154727 A1 | 6/2010 | Malgorn et al. |
| 2010/0158717 A1 | 6/2010 | Vogt |
| 2010/0263758 A1 | 10/2010 | Young et al. |

OTHER PUBLICATIONS

Rane Ring Vapor Holder Systems, R.A. Nichols Engineering (www.raneng.corn), downloaded Nov. 7, 2014, 2 pages.

Vapor Holders, R.A. Nichols Engineering (www.raneng.com), downloaded Nov. 7, 2014, 2 pages.

Truck Transportable Portable Vapor Bladder, R.A. Nichols Engineering (www.raneng.com), downloaded Nov. 7, 2014, 3 pages.

Terminal Vapor Recovery Sizing Data, R.A. Nichols Engineering (www.raneng.corn), downloaded Nov. 7, 2014, 1 page.

* cited by examiner

HYDROCARBON VAPOR RECOVERY SYSTEM

CROSS REFERENCES TO RELATED APPLICATIONS

This application claims the benefit under 35 U.S.C. §119 (e) of U.S. Provisional Patent Application No. 61/438,834 filed Feb. 2, 2011 entitled "Constant Pressure Vapor Scrubber" by Hans P. Mueller; U.S. Provisional Patent Application No. 61/451,557 filed Mar. 10, 2011 entitled "Hydrocarbon Vapor Recovery System" by Hans P. Mueller; and U.S. Provisional Patent Application No. 61/570,700 filed Dec. 14, 2011 entitled "System and Methods for Reducing Oxygen in a Stream of Natural Gas and Natural Gas Liquids" by Hans P. Mueller, the disclosures of each of these provisional patent applications are hereby incorporated by reference in their entirety.

FIELD

This invention relates, in general, to systems and devices for recovering gas vapors from oil storage tanks.

BACKGROUND

In oil recovery and storage operations, hydrocarbon gases are produced from oil condensate storage tanks through flash losses, working losses, standing losses, and breathing losses, where liquid hydrocarbons evaporate into gaseous form. Working losses occur when the liquids are agitated, i.e., when new liquids are pumped into the tanks; breathing losses are primarily the result of diurnal heating of the tanks; and flash losses occur as the result of a sudden pressure drop which occurs when liquid hydrocarbons move from a separator (i.e., at approximately 100-250 psig) to an oil condensate storage tank at much lower pressure (i.e., 0 to 2 psig). Flash losses account for a significant portion of total losses. Collectively, these losses of hydrocarbon gases are referred to herein interchangeably as "flash emissions," "vent gas," "flash gas," "vapor" and combinations thereof.

Flash emissions include Volatile Organic Compounds (VOC) and therefore pose a hazard to air quality as they form ground level ozone when they react with NOx. Historically, such vent gases were vented through relief valves of the storage tanks into the atmosphere.

To protect the environment and the health of the public at large, the permissible levels for ground level ozone and, in turn, uncontrolled flash emissions from oil storage tanks are regulated by various regulatory agencies at federal and state levels. Methods of flash emissions control include flaring, where the flash emissions are burned off, and more advanced systems of vapor recovery that capture, compress, and inject these flash emissions into nearby gas gathering pipelines, such as described in U.S. Pat. No. 7,350,581.

However, traditional systems are typically either sized for average flow rate of flash emissions, which tends to overwhelm such traditional systems during the peak rate of flash emissions when liquids migrate to the tanks; or peak flow rate, which involves extremely high capital equipment costs where the equipment only runs for brief periods throughout day, with minimal usage of compression capacity and increased maintenance costs.

As these gaseous flash emissions are saturated and exist at or slightly above atmospheric pressure, the present inventor has recognized a need to remove condensed liquids from these flash emissions to prevent catastrophic failure of downstream compression equipment, as well as a need to address the intermittent nature of flash emission production in traditional natural gas production. The present inventor has also recognized the need, in some circumstances, for reducing the oxygen content present in recovered vapors.

SUMMARY

In light of the above and according to one broad aspect on an embodiment of the present invention, disclosed herein is a system for recovering flash gas from an oil storage tank. In one example of the invention, the system may include a flexible storage tank that receives the flash gas and temporarily stores the flash gas; a compressor having an input receiving the flash gas from the flexible storage tank, the compressor compressing the flash gas to form compressed gas; and an oxygen reduction subsystem receiving the compressed gas, the oxygen reduction subsystem reducing an amount of oxygen from the compressed gas. In this manner, the resulting compressed oxygen-reduced gas that has been recovered can be injected into a sales gas line, under certain conditions.

In one example of the invention, the flexible storage tank scrubs liquids from the flash gas and collects the liquids in the bottom of the flexible storage tank. The flexible storage tank can have a drain located near a bottom of the flexible storage tank, and liquids scrubbed from the flash gas flow out the drain when a drain valve is open. The flexible storage tank can be made of deformable material.

In another example of the invention, the system may also include a pressure relief valve coupled with the flexible storage tank for releasing flash gas from the flexible storage tank when the pressure inside the flexible storage tank exceeds a limit.

In one example, the compressor is a two-stage compressor with a scrubber connected between the first stage and the second stage of the compressor.

In another example of the invention, the oxygen reduction subsystem includes a pipe fluidly coupled with an output of the compressor to receive the compressed gas; one or more heaters adjacent to the perimeter of the pipe, said heaters heating the compressed gas inside the pipe; and a vessel having an input and an output, the input receiving the heated compressed gas, wherein the vessel contains an oxygen reducing catalyst that reduces the oxygen content of the heated compressed gas.

In one example, the vessel contains a first section and a second section adapted to receive the heated compressed gas in sequence, the first section housing a material (i.e., zinc oxide) to remove sulfur from the heated compressed gas, and the second section including an oxygen reducing catalyst (i.e., palladium).

The oxygen reduction subsystem may also include a heat exchanger coupled with the output of the vessel, the heat exchanger cooling the heated compressed gas to form cooled compressed gas. A check valve can be coupled with an output of the heat exchanger to prevent flow of the cooled compressed gas back into the heat exchanger.

The oxygen reducing subsystem may also include an oxygen sensor to detect the oxygen content of the cooled compressed recovered gas; a three-way valve having an input coupled with an output of the check valve, the three-way valve having a first output coupled with a sales gas pipeline, and a second output coupled with a flare to burn off the cooled compressed gas if needed; and logic for controlling the three-way valve, the logic receives data from the oxygen sensor relating to the oxygen content of the cooled compressed gas. If the logic determines that the cooled compressed gas contains an amount of oxygen in excess of an oxygen-content specification, the logic activates the three-way valve to divert the cooled compressed gas to the flare for burn-off into the atmosphere. If the logic determines if the cooled compressed gas contains an amount of oxygen in compliance with an oxygen-content specification, the logic activates the three-way valve to direct the cooled compressed gas to the gas pipeline. In this manner, the system ensures the recovered gas is injected into the sale gas pipeline only if it is within oxygen-content specifications.

The features, utilities and advantages of the various embodiments of the invention will be apparent from the following more particular description of embodiments of the invention as illustrated in the accompanying drawings.

DETAILED DESCRIPTION

As shown in FIGS. 1-14 and as described herein, various embodiments of a hydrocarbon vapor (i.e., natural gas) recovery system 20 are disclosed. As described herein, embodiments of the invention provide for safe, efficient, and reliable recovery of substantial amounts of hydrocarbons and natural gas present in flash emissions, while preventing, through the use of an oxygen reduction system or sub-system 22, concentrated oxygen from entering the sales gas pipeline 24.

Figure 1:
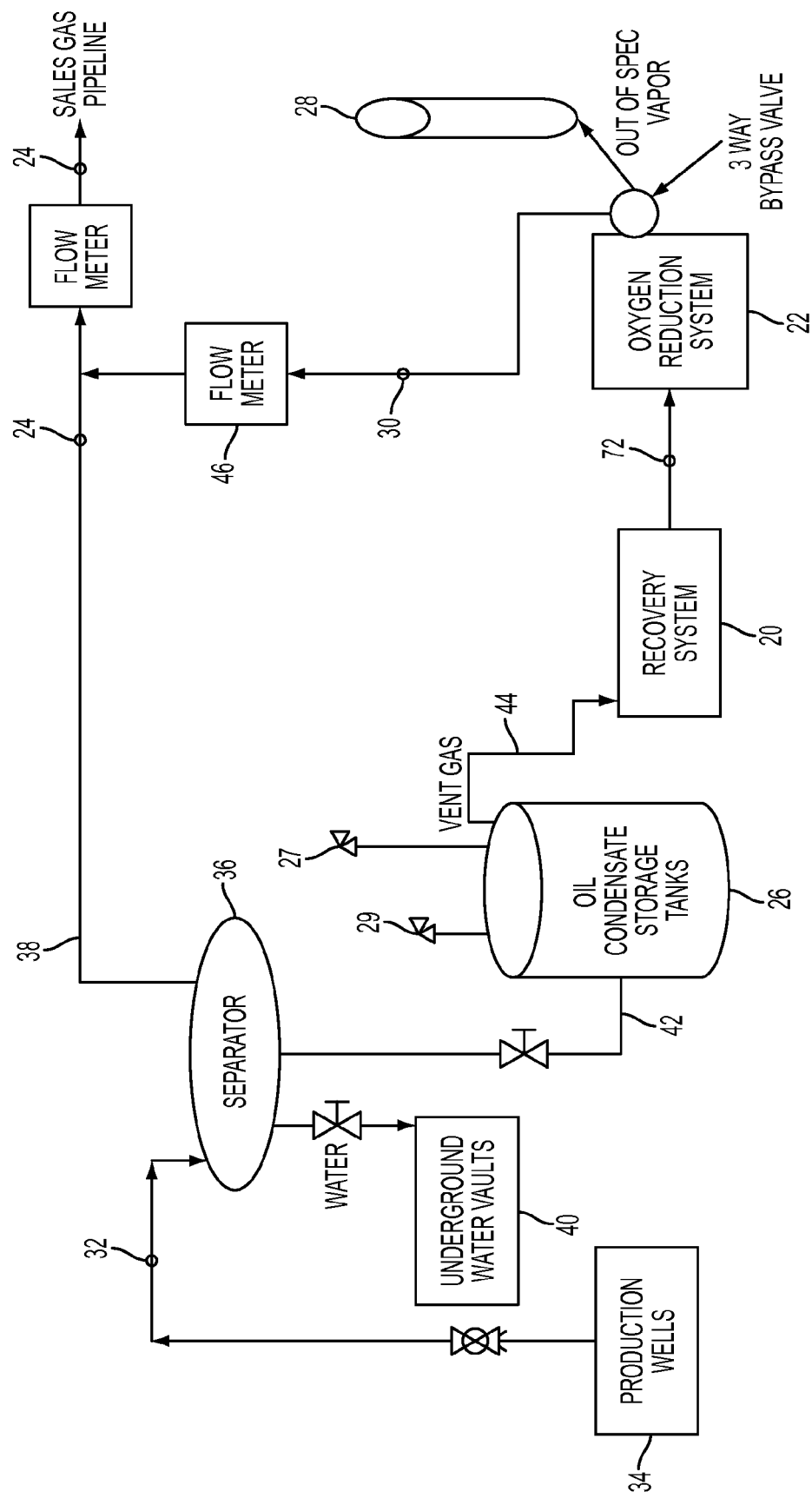
FIG. 1 illustrates an example of a hydrocarbon vapor (i.e., natural gas) recovery system that includes an oxygen reduction system, connected with an oil condensate storage tank, a flare, and a sales pipeline to provide recovered vapor to the sales pipeline, in accordance with an embodiment of the present invention.

In accordance with an embodiment of the present invention and referring to FIG. 1, an example is shown of a recovery system 20, having an oxygen reduction system 22, connected with one or more condensate storage tanks 26 (with a thief hatch 27 and relief valve 29), a flare 28, and a sales gas pipeline 24 to provide recovered vapor 30 to the sales gas pipeline 24.

As oil 32 is produced in production wells 34 and brought to the surface by plunger lifts (not shown), such oil/fluids 32 are introduced into a separator 36, which separates oil 32 from gas 38. Most natural gas wells 34 produce natural gas and liquids, both hydrocarbons and water. Liquids are removed from the produced stream by a separator 36 immediately downstream of the production wellhead 34. The separator 36 separates liquid H20 and sends it to water vault(s) 40, while liquid hydrocarbons, also known as oil condensate 42, are sent to large oil condensate storage tank(s) 26 that typically maintain pressures from atmospheric pressure to 1 psig. The separator 36 also sends the desired natural gas 38 to the sales pipeline 24 for further conventional processing downstream.

The separator 36 typically operates at sales pipeline pressure which is typically from 30 psig to over 500 psig, significantly higher than atmospheric pressure. The storage tank 26 is typically at a much lower pressure, typically between 0 to 1 psig, with 2 psig being a maximum allowable working pressure for oil condensate storage tanks 26. Accordingly, as oil 42 moves from the separator 36 to the storage tank 26, flash emissions/vent gases 44 are created.

In one example, the recovery system 20 and the oxygen reduction system 22 are coupled between the storage tank 26 and the flare 28 in a pass-through configuration, so that the recovery system 20 can capture the flash emissions 44 and convert flash emissions 44 to recovered vapor 30 to be sent to the sales pipeline 24. If needed, the recovery system 20 and the oxygen reduction system 22 can also direct flash emissions 44 to the flare 28 for burn-off or incineration under certain circumstances, described below, for instance when flash emissions 44 are contaminated with excessive oxygen/air. A flow meter 46 can be provided in-line with the output of the oxygen reduction system 22 to measure the amount of recovered vapor 30.

Figure 2:
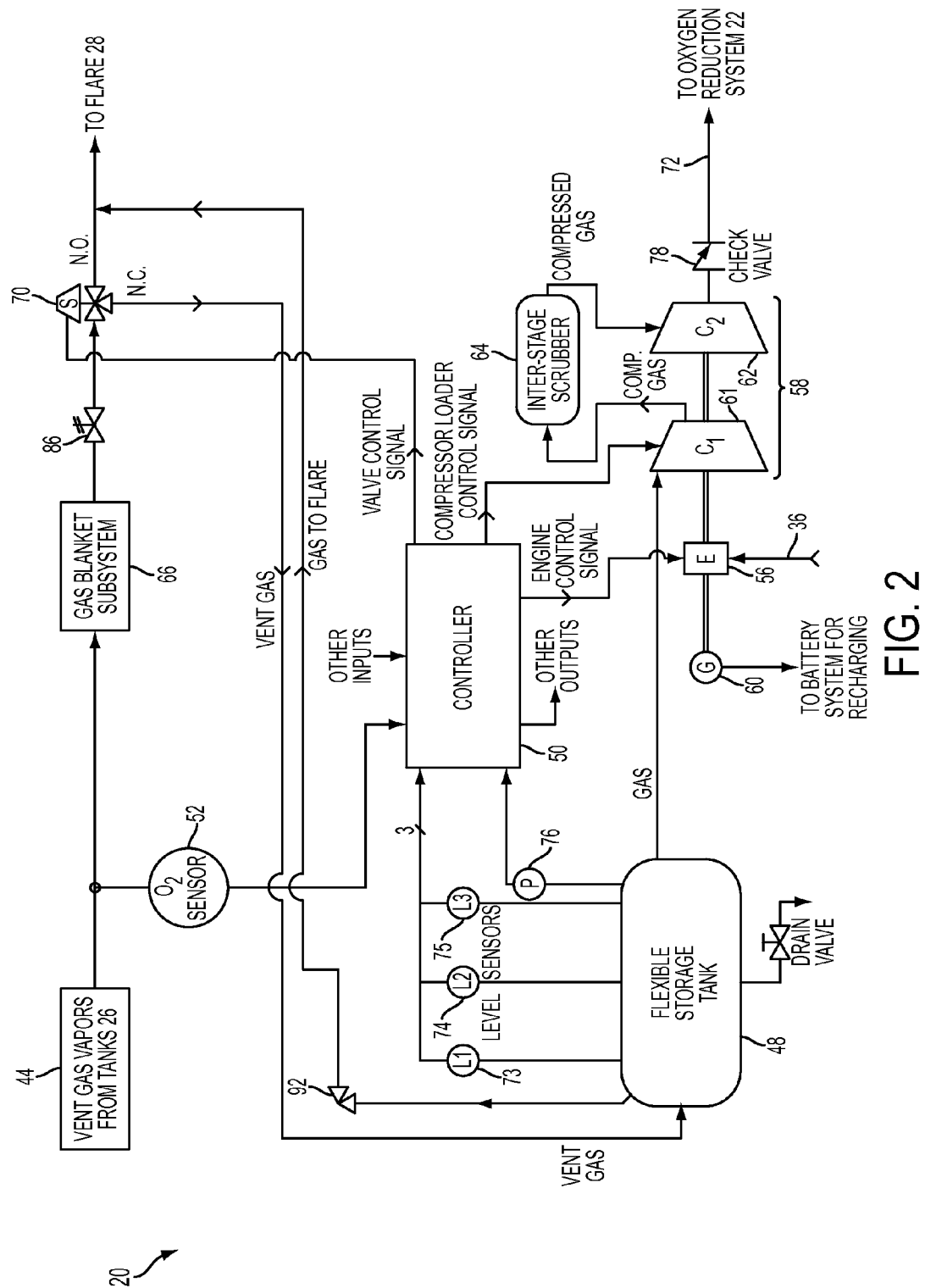
FIG. 2 illustrates an example of a hydrocarbon vapor recovery system, in accordance with one embodiment of the present invention.

In FIG. 2, an example of a natural gas recovery system 20 is illustrated in accordance with one embodiment of the present invention. In one example, the recovery system 20 maintains a slightly positive pressure in the condensate tanks 26 (referred to herein as a "gas blanket"); detects the presence of oxygen in the flash emissions 44, collects non-oxygen contaminated flash emissions 44, and passes flash emissions 44 (contaminated with excessive oxygen concentration) to the flare 28 for incineration; scrubs entrained liquids from the flash emissions 44 in a flexible storage tank (FST) 48 (also referred to as a scrubber) while collecting vapor 44; and based on the fill level of the flexible storage tank 48, compresses the captured vapor 44 to create recovered vapor to send into the sales pipeline.

In FIG. 2, the system 20 may include a controller 50 (also referred to as a PLC or logic) with inputs and outputs, an oxygen sensor 52 (and an oxygen sensor 54 of the oxygen reduction subsystem 22), a flexible storage tank 48, an engine 56 driving a compressor 58, and a generator 60. The compressor 58 may be a 2-stage compressor 61, 62, with a scrubber 64 connected between the first compressor stage 61 and the second compressor stage 62. A gas blanket subsystem 66 for maintaining a slightly positive pressure in the oil condensate storage tanks 26 may also be included, as described with reference to FIG. 4. An electrical power system 68 may also be provided as described below with reference to FIG. 5.

As shown in FIG. 2, the system 20 may include a 3-way valve 70 fluidly coupled between the oil condensate storage tank 26, the flare 28, and a flexible storage tank 48. The 3-way valve 70 (which in one embodiment is a solenoid controller 3-way motor valve) may be configured in a pass-through mode, wherein in its normally opened state, the valve 70 fluidly connects the oil condensate storage tank 26 to the flare 28 and no flash gases 44 pass into the flexible storage tank 48; and when the solenoid is energized, the 3-way valve 70 fluidly connects the oil condensate storage tank 26 to the input of the flexible storage tank 48 (and disconnects the flare 28) so that flash emissions 44 are diverted into the flexible storage tank 48 and are processed into recovered vapor 72 through the recovery system.

An oxygen sensor 52 may be provided to sample the oxygen content of the flash emissions 44, the oxygen sensor 52 providing such data to the controller 50. In one example, if the oxygen concentration levels in the flash emissions 44 are above a threshold (e.g., 1%), the controller 50 directs the flash emissions 44 through the 3-way valve 70 to the flare 28 so that the gas 44 is burned. This provides a safety mechanism in that oxygen-rich flash emissions 44 are burned off at the flare 28 and not recovered by the system 20.

Stated differently, the recovery system 20—through the use of the oxygen sensor 52—detects whether the flash emissions vapors 44 are contaminated with excessive amounts of oxygen/air (i.e., more than 1% concentration). If so, these contaminated flash emissions 44 are passed by the recovery system 20 through the three-way valve 70 to the flare 28 for incineration.

If the recovery system 20 determines that the flash emissions 44 are not contaminated with excessive oxygen/air (i.e., less than 1% concentration), then these uncontaminated flash emissions 44 are re-directed by the recovery system 20 through the three-way valve 70 to the flexible storage tank 48 for recovery.

The system 20 may also include one or more level sensors 73-75 that are used to indicate to the controller 50 the level or height of the flexible storage tank 48 (which correlates to the amount of flash emission 44 currently present in the flexible storage tank 48), and such information is used by the controller 50 to activate and de-activate the compressor(s) 58. In one example, the level sensors 73-75 provide a range of level values, and in another example the level sensors 73-75 are limit switches which indicate when portions of the flexible storage tank 48 are above/below a predetermined level. In one example, the level sensors 73-75 (FIG. 13) are distributed along the flexible storage tank 48 so that the levels of different portions of the flexible storage tank 48 are detected. In one example, three level sensors 73-75 are provided, and if all three level sensors are down or in a low position (indicating the absence of flash emissions 44 in the flexible storage tank 48), then the controller 50 turns off the compressor(s) 58. Conversely, if only one level sensor is up (thereby indicating the presence of some flash emissions 44 in a portion of the flexible storage tank 48), then the controller 50 activates the engine 56 to start the recovery process.

A pressure sensor 76 may also be coupled with the flexible storage tank 48, to provide pressure data to the controller 50 of the amount of pressure within the flexible storage tank 48.

The output of the flexible storage tank 48 is fluidly coupled with the input of the compressor 58/61. As mentioned above, the compressor 50 can be implemented using a two-stage, reciprocating positive displacement compressor with a scrubber 64 connected between the first compressor stage 61 and the second compressor stage 62. The output of the compressor 58 (e.g., the output of the second compressor stage 62) provides the recovered vapor 72 through a check valve 78 (optional) to the oxygen reduction system 22 (or to the sales pipeline 24 if no oxygen reduction system 22 is used). In another embodiment, a motor (not shown) can be used to compress the gas from the output of the flexible storage tank 48 to form compressed recovered vapor 72, or a wide variety of other conventional equipment could be used as or in place of the compressor 58 depending upon the implementation.

As shown in FIG. 2, an engine 56 can be used to power the compressor 58, for instance through a direct belt drive. In one example, the engine 56 runs using natural gas from the separator 36, and the compressor 58 is unloaded at engine startup until a timer (i.e., 45 sec. to 2 minutes) runs out, and then the compressor 58 is loaded.

Gas Blanket

Figure 4:
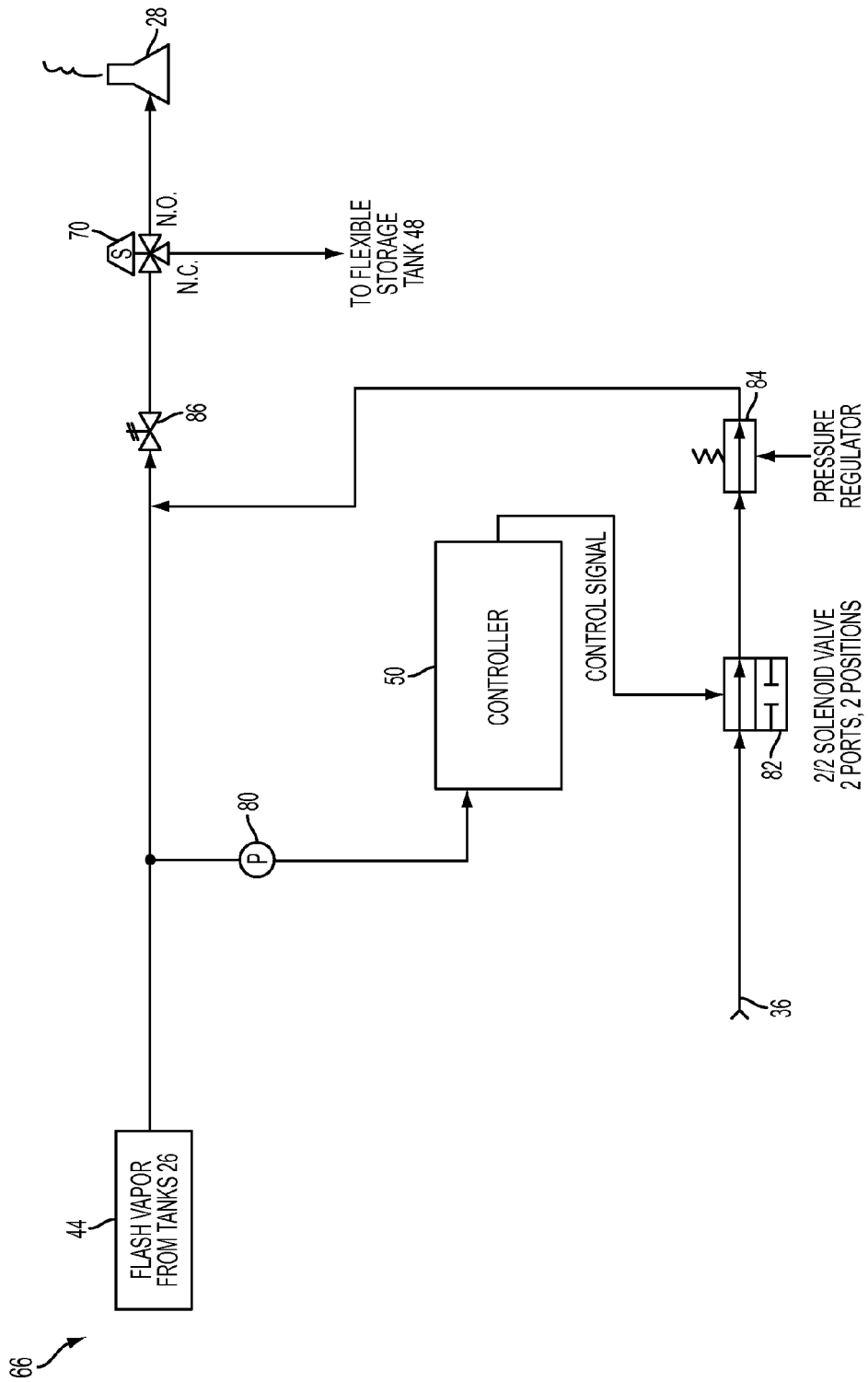
FIG. 4 illustrates an example of a gas blanket subsystem for a hydrocarbon vapor recovery system, in accordance with one embodiment of the present invention.

In one example and referring to FIG. 4, a gas blanket subsystem 66 may be provided as part of a gas recovery system 20. The gas blanket subsystem 66 monitors and maintains a slight positive pressure in the oil condensate storage tanks 26 and the conduit line between these tanks and the input to the recovery system 20. A slight positive pressure reduces the amount of air (and therefore oxygen) that would otherwise enter the oil condensate storage tanks 26 and would contaminate the flash emission vapors 44. Under normal circumstances, the oil condensate storage tanks 26 will produce their own pressure as a result of vapor losses, but the gas blanket subsystem 66 injects natural gas from the separator 36 into the oil condensate storage tanks 26 when their internal pressure fall below a set threshold.

In one example, the gas blanket subsystem 66 (FIG. 4) includes a pressure sensor 80 sampling the pressure of the output conduit line of the oil condensate storage tank 26. This pressure sensor 80 is coupled with the controller 50 to provide the controller 50 with real-time pressure readings of the tank pressure 26. A solenoid controlled valve 82 is fluidly coupled with the separator 36, and the output of the solenoid valve 82 is fluidly coupled with a pressure regulator 84, wherein the output of the pressure regulator 84 is coupled with the output conduit line of the oil condensate storage tank 26. An output signal from the controller 50 controls the operation of the solenoid valve 82. The pressure regulator 84 can be configured to regulate pressure in the ounce/sqr. inch range.

In one example, the controller 50 sends a signal to open the solenoid valve 82 if the line pressure (as measured by the pressure sensor 80) falls below a threshold (e.g., 2 oz/sqr. inch), thereby injecting natural gas into the oil condensate storage tanks 26. If the pressure fails to rise within a set time limit (e.g., 1 to 45 minutes), the controller 50 closes the solenoid valve 82 until the pressure rises above the threshold (e.g., 2 oz/sqr. inch) on its own. The pressure may be staying too low over this time limit because the hatch opening 27 or relief valve 29 of the oil condensate storage tank 26 may be open. The controller 50 will also close the solenoid valve 82 if the pressure rises above the threshold for a given time (e.g., 1 second). This timer is included to filter pressure spikes that occur when the pressure gate valve 86 (FIGS. 2,4) slams shut during valve flutter which can occur before full lift of the pressure gate 86.

Pressure Gate

In one example of an embodiment of the invention, a pressure gate 86 (e.g., pressure relief valve) is provided downstream of the gas blanket injection point and upstream of the 3-Way valve 70. The pressure gate 86 opens based on a threshold amount of upstream pressure of vent gas 44 (wherein the threshold is set by a user, in one example, 4 oz/sqr. inch for vapor to pass through the gate, and 6 oz/sqr. inch for full lift/flow through the gate) to allow gas 44 to pass through. This pressure gate 86 allows the system to preserve a positive pressure in the oil condensate storage tanks 26, while maintaining a nearly atmospheric/ambient working pressure for the flexible storage tank 48, which thereby permits the flexible storage tank 48 to operate on a variable volume/constant pressure basis. Stated differently, if the condensate tanks 26 positive pressure were in direct fluid communication with the flexible storage tank 48, the flexible storage tank 48 would fill until full in a constant pressure process, then the flexible storage tank 48 material would start to strain as pressure builds, which would be undesirable.

In one example, the maximum allowable working pressure for the flexible storage tank 48 is 1.0 psig, wherein electronic and mechanical safety measures kick in at 3 oz/sqr. inch when additional flash emissions vapor 44 is diverted from entering the flexible storage tank 48 and excess internal pressure to the flexible storage tank 48 is bled off.

Flexible Storage Tank (FST)

In one example, a flexible storage tank 48 (also referred to as a scrubber) is coupled with the three-way valve 70, collects flash emissions vapor 44, and scrubs the flash emissions vapors 44 of entrained liquids. It can be sized to accept approximately twice the typical amount of vapor losses/flash emissions 44 associated with one plunger trip up the production well.

For instance, flash emissions vapor 44 is produced intermittently based on the timing of oil production via plunger lifts. As the plunger lift brings liquids to the surface and into the separator 36 periodically, resulting flash emissions/working losses 44 have been measured, in one example, on the order of approximately 1250 cu. ft. over approximately 10 minutes after liquids are dumped from separator to the oil condensate storage tanks. This production of flash emissions 44 can happen approximately 10 times per day, in one example.

Collecting and storing the flash emission vapor 44 in the flexible storage tank 48 between plunger lift cycles allows for the use of smaller, more economical compression equipment 58 within the recovery system 20, which lowers capital costs and reduces maintenance expenses of the system 20 when compared with systems that use rigid storage tanks.

The flexible storage tank 48 can be a non-rigid, deformable, air-tight bladder with one or more ports for connections thereto. Examples of embodiments of flexible storage tanks 48 are described with reference to FIGS. 12-14.

Controller

Figure 3:
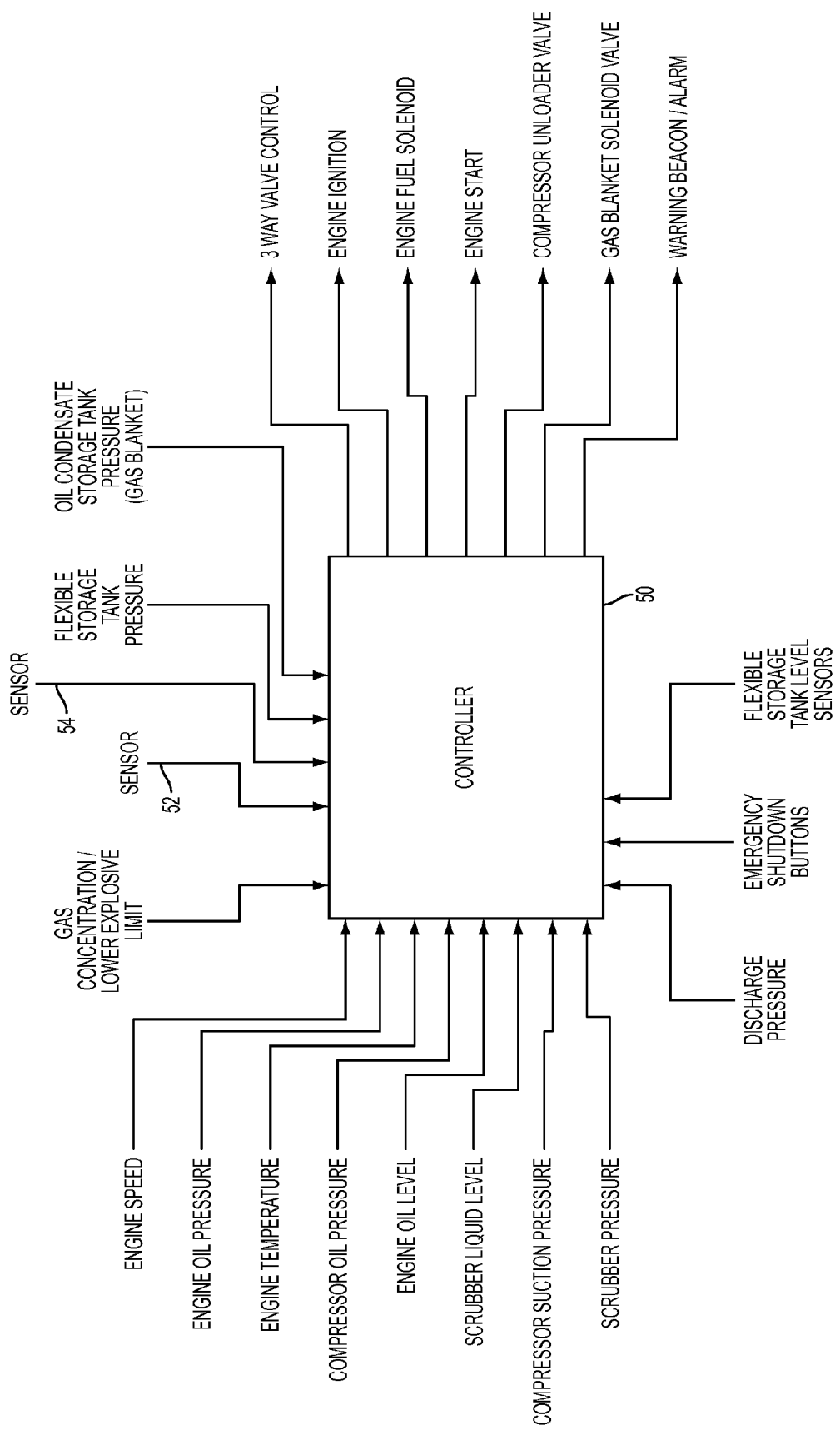
FIG. 3 illustrates an example of a controller for a hydrocarbon vapor recovery system, in accordance with one embodiment of the present invention.

FIG. 3 illustrates one example of a controller 50 (also referred to as "logic" or PLC) that can be used in a recovery system 20, in accordance with one embodiment of the present invention. In one example, the controller 50 is a programmable logic controller (PLC), such as a Direct Logic 06 PLC, although any conventional controller, processor or logic can be used. As shown in FIG. 3, the controller 50 may be configured to receive a plurality of inputs, either directly or through interface circuitry, and the inputs may include but are not limited to: engine speed input, which may be derived from a magnetic pickup on the engine 56 flywheel to monitor engine speed; engine oil pressure; engine temperature, which may be derived from radiator coolant temperature; compressor 58 oil pressure; engine oil level; the liquid level in the flexible storage tank 48, which may be a high liquid level trigger so that if the liquid level in the interstage scrubber is too high, then flash emissions 44 are diverted to flare 28; compressor 58 suction pressure, which may measure suction pressure for the first compressor stage 61, and if too low or too high, the system may be shut down; flexible storage tank 48 pressure; wherein if the interstage scrubber 64 pressure is too high, then may need to shut the system down; discharge pressure sensor, which may be measured at the output of the check valve, and if too high, may need to shutdown system; emergency shut down buttons, which may include one internal emergency shutdown button and one external emergency shut down button 90 (FIG. 6); flexible storage tank level sensors 73-75; gas concentration measurements, including lower explosive limit (LEL) measurements, relating to amounts of explosive gas detected within the enclosure of the system (i.e., if 5%-10% of LEL, system is shut down); oxygen sensors 52, 54, such as described herein; flexible storage tank pressure 76, wherein if greater than 3 oz/sqr. inch, flash emissions stream 44 is diverted to the flare 28 until flexible storage tank pressure 76 is less than 1 oz/sqr. inch (note, a mechanical pressure relief valve 92 may also be used for the flexible storage tank 48, and may open when the pressure is greater than 3 oz/sqr. inch for example; oil condensate storage tank pressure 80, wherein if this pressure is too low, the gas blanket reinjection system 66 is enabled, but if this value is extremely low, then it may mean that the oil tank valves 27, 29 are probably left open, so a shutdown may occur and a notification (i.e., email and/or text message or other conventional communications techniques) can be sent to a persons or companies (such as a representative of the oil company) informing them that the hatch 27/valve 29 are open.

The controller 50 may also be configured to provide one or more outputs, either directly or through conventional interface circuitry, such as but not limited to: a control signal for controlling the solenoid of the three-way valve 70; and engine 56 ignition control signal; and engine fuel solenoid control signal for opening a valve to provide fuel to the engine 56; an engine start control signal for energizing a starter relay for the engine starter; a control signal for a compressor unloader valve, which may have a delay such as 45 seconds to 2 minutes, so that the engine 56 runs for that delay period before the compressor 58 is loaded; a control signal for activating the gas blanket solenoid valve 82; and a signal to activate a warning beacon light or alarm 94 (FIG. 6) if needed, for instance, if excessive gas levels inside the enclosure 96 are detected.

The controller 50 may also be provided with a display and a keyboard, or with a touch screen, in order to provide status information regarding the system, and/or to provide controls for an operator.

The controller 50 may implement one or more functions or operations as described herein. In one example, the controller 50 implements one or more of the following operations or sequence of operations:

Setup Inputs:
    O2 concentration monitoring system
    LEL (lower explosive limit) concentration monitoring system
    Flexible storage tank pressure sensor
    Condensate holding tank pressure Setup Engine speed fast counter—measures RPM
    Counts gear teeth per second
    Divides by number of teeth (82)
    Multiply by 60 to get RPM Scale analog inputs
    LEL: 0-100.0%
    O2: 0-5.000%
    Flexible storage tank Pressure: 0-57.80 oz/sqin
    Condensate tank Pressure: 0-57.80 oz/sqin
    Zero inputs Send power to O2 Monitor
Send power to O2 Sample pump if:
    Activated on HMI (human machine interface—touchscreen), and
    Emergency Shutdown Pushbutton (ESD PB) not pressed, and
    Engine run permissive OK (discussed below)

Activate external LEL warning beacon if internal explosive gas level reaches set threshold (set at 10% LEL)

Gas Blanket—maintains pressure inside condensate storage tanks.
    Blanket solenoid valve opens if:
        LEL SD (shutdown) not present, and
        ESD PB not pressed, and
        Gas Blanket activated on HMI
    Blanket solenoid closes if:
        Pressure rises above 2 oz/sqin for >1 second. 1 sec timer is present to prevent erroneous pressure spikes caused when pressure gate slams shut during valve "flutter."
        Pressure below 0.75 oz/sqin for 45 mins, (resets if Pressure goes above 1.5 oz/sqin on its own). Purpose: when a pump truck empties the tanks, pressure will drop. This will take <45 mins. If they forget to close a hatch/valve on the tank, Pressure will continue to stay <0.75 oz, so this will stop the flow of gas into atmosphere. If Pressure rises above 1.5 that would mean the hatches are shut, therefore this is reset.
            If the tank hatches or pressure relief valves are left open, the pressure will not rise over time despite the reinjection of sales gas. When the PLC senses this, it will shut off the gas blanket, in one example activate a remote monitoring system that provides notification to the producer or others that the tank is venting.

3-Way Valve (Normally Open to Flare, requires energization to divert to flexible storage tank)
Gas sent to flexible storage tank if:
    Internal LEL below set threshold (10%)
    ESD PB not depressed
    Gas to Flare relay NOT activated on HMI
    Engine run permissive OK (discussed below)
    Flexible storage tank Pressure <3 oz/sqin
        If Pressure >3 oz/sqin, tank vapors sent to flare until Pressure <1 oz/sqin
    Tank vapor O2 content is <site-specific threshold (currently set at 1% O2, in one example)
        If O2%> threshold, tank vapors sent to flare until a given amount of time after the O2 concentration is below threshold (3 seconds currently)

Engine/Compressor Start, Stop, Run:
List of ShutDowns:
    Engine Failed to Start—If engine doesn't fire up after 5 attempts at cranking.
    Engine Oil Pressure (Murphy Panel)—If engine Oil Pressure doesn't rise to proper level after 3 minutes of running.
    Engine Coolant Temp (Murphy Panel)—If engine coolant temp gets too high for 1 second
    Compressor Oil Pressure (Murphy Panel)—If compressor oil pressure does not rise to proper level after 3 minutes of engine run time
    Engine Oil Level—If engine oil level falls below designated level for 1 second
    Interstage Scrubber Liquid Level—If liquid level inside inter-stage scrubber vessel rises above allowable level for 1 second
    Suction Vacuum SD—If suction pressure for the $1^{st}$ stage of compression falls below −4 oz/sqin (−¼ psig) for 1 minute while engine is running. Indicative of empty flexible storage tank or blockage
    Interstage Scrubber Pressure—If pressure within inter-stage scrubber vessel rises above allowable level (based on a fraction of MAWP) for 1 second. Indicative of second stage compression failure.
    High Discharge Pressure SD—If the discharge pressure ($2^{nd}$ stage) of the vapor recovery system gets too high (250 psi in this case), the unit will kill the engine in a "soft" shutdown. It will retry once/hour, every hour for 24 hours (in one example) before a "hard" SD that requires a manual reset. This would be the case with a frozen/blocked discharge line.
    LEL SD—If lower explosive limit rises above set threshold (10% in this case) for 2 seconds: "hard" SD requiring a manual reset
    Emergency Shutdown Pushbutton—There are two ESD PB's on the unit, one internal and one external. If either one is pressed, the system will shutdown until it is depressed and all other SD's are cleared.

Engine Run Permissive
Engine is able to run/start if:
    "Engine Oil Pressure Shutdown" not present
    "Engine Coolant Temperature Shutdown" not present
    "Engine Oil Level Shutdown" not present
    "Compressor Oil Pressure Shutdown" not present
    "Inter-stage Scrubber High Liquid Level Shutdown" not present
    "Inter-stage Scrubber High Pressure Shutdown" not present
    "$1^{st}$ Stage Vacuum Suction Shutdown" not present
    "LEL Shutdown" not present
    "ESD PB Shutdown" not present
    "Failed to Start Shutdown" not present
    Current LEL reading below 10%
    High Pressure Discharge "soft" Shutdown not present
    High Pressure Discharge "hard" Shutdown not present Engine/Compressor Shut Down
    Engine ignition voltage is cut if Limit Switch DOWN Timer Complete/On
        flexible storage tank Fill Limit Switch Circuit is closed for 1.5 minutes. The presence of this timer allows the compressor to continue to run and evacuate the flexible storage tank past the point of where the limit switches are pulled down. This ensures that a substantial amount (depending on timer, ~35 cf in this case) must enter the flexible storage tank before the limit switches open up and start the timer that will allow the engine to run. Benefit: reduced number of engine starts/stops due to minor volume influxes primarily resulting from working/breathing losses as opposed to flash losses associated with a slug of hydrocarbon liquids entering the tanks.

Engine/Compressor Startup—
  Engine Start Contact—Preliminary Requirements for an engine start:
    "Engine Run Permissive" requirements satisfied
    Engine Speed <400 RPM
    Internal LEL <10.0%—This is in the Engine Run Permissive logic which may be used depending on the implementation
    "Limit Switch UP Timer" Complete/ON—flexible storage tank Fill Limit Switch circuit (3 normally open limit switches wire series) is broken for a designated amount of time. This time is highly variable depending on site-specific Flash Gas production characteristics (i.e., 5 seconds on one location; 10 minutes on another location).
    "Limit Switch DOWN Timer" NOT Complete/OFF—can be used case UP Timer did not reset for some reason
      This can be bypassed as voltage is applied to the starter motor—analogous to an OR function
  Fuel Supply
    "Fuel Supply Valve/Starter Delay Contact"—Fuel valve opens 2 seconds before an engine start occurs. Fuel Supply Valve/Starter Delay Contact ON if:
      "Engine Start Contact" OR "Engine Ignition Voltage Relay" are ON, and
      "Engine Run Permissive" activated, and
      "ESD PB" not depressed, and
      "Limit Switch DOWN Timer" NOT Complete/OFF
    "Fuel Valve" Energizes/Opens if:
      "Fuel Supply Valve/Starter Delay Contact" is ON, and
      "ESD PB" not depressed
    "Fuel Catch Up Timer" (2 seconds) is activated if
      "Fuel Supply Valve/Starter Delay Contact" is ON
  Engine Starter—Voltage applied to "Starter Relay" (physical element as opposed to "Starter Contact") if:
    "Start Contact" ON, and
    ESD PB not depressed, and
    "Fuel Catch Up Timer" ON, and
    "Engine Crank Timer" is OFF/has not reached timer limit.
      "Engine Crank Timer" measures the time that voltage is sent to the "starter relay." If the "Engine Crank Timer" reaches 10 seconds, this means that the starter tried to start the engine for that period of time unsuccessfully. If that happens, it waits for 10 seconds and tries again. The system will attempt this 5 times before activating the "Failed to Start Shutdown"
  Engine Ignition—this is the voltage that is applied across the igniter (controls spark plug voltage and timing). Ignition voltage is applied if:
    "Fuel Catch Up Timer" is ON/reached the limit, and
    "Starter Relay" ON, OR Engine Speed >100 RPM
    LEL <10.0%
  "Compressor Unloader"—Pneumatic valve that opens and prevents gas from being compressed. This assists in startup because the compressor can turn and build up oil pressure with relatively little load. "Compressor Unloader" is on if:
    "Engine Ignition" is ON, and
    "Unloader Timer" OFF/has not reached timer limit
      "Unloader Timer" starts counting once Engine Speed >500 RPM
      Typically set between 45 sec and 2 minutes.

It is understood that a controller 50 for a recovery system 20 could be implemented using one or more of these operations, or combinations thereof, in accordance with other embodiments of the present invention.

Figure 5:
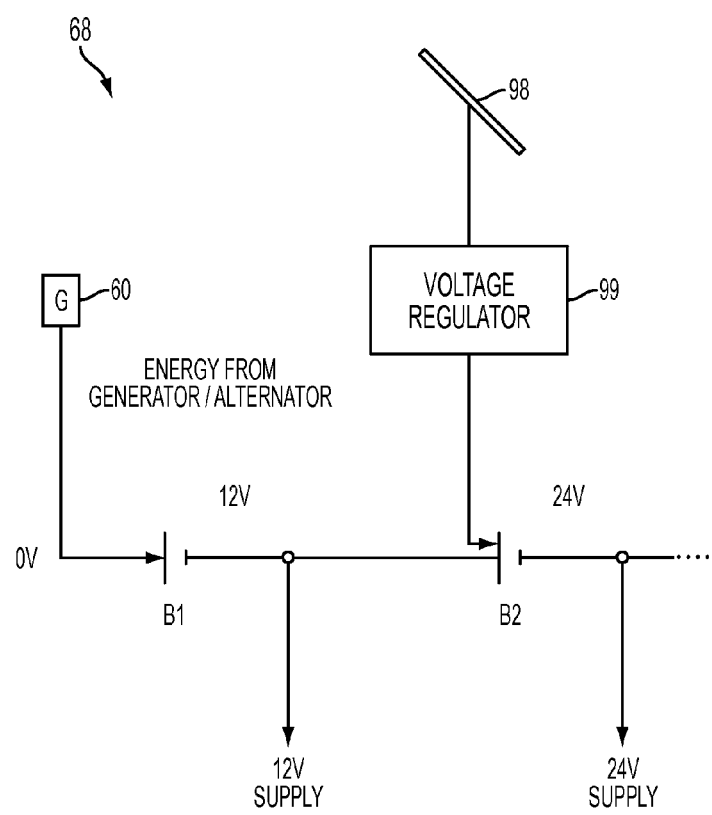
FIG. 5 illustrates an example of an electrical power sub-system for a recovery system, in accordance with one embodiment of the present invention.

FIG. 5 illustrates an example of an electrical power system 68 that may be employed in a recovery system 20, in accordance with one embodiment of the present invention. In one example, two or more batteries B1, B2 may be connected in series, wherein B1 may be a 12 volt battery, and B2 may also be a 12 volt battery, and therefore the series combination provides 24 volts. Energy from the generator 60 (which may be implemented using an alternator) can be coupled with B1 to provide re-charging during operations of the engine 56. One or more solar panels 98 can be provided on the exterior of the enclosure 96 of the recovery system, and through a voltage regulator 99, can provide re-charging to B2. In this way, the recovery system 20 can utilize either or both 12v and 24v supplies as needed. Moreover, through the combined use of solar power 98, a recharging alternator/generator 60, and natural gas fuel (received from the separator 36) to power the engine 56/compressor 58, the recovery system can operate without any external electrical power sources.

Figure 6:
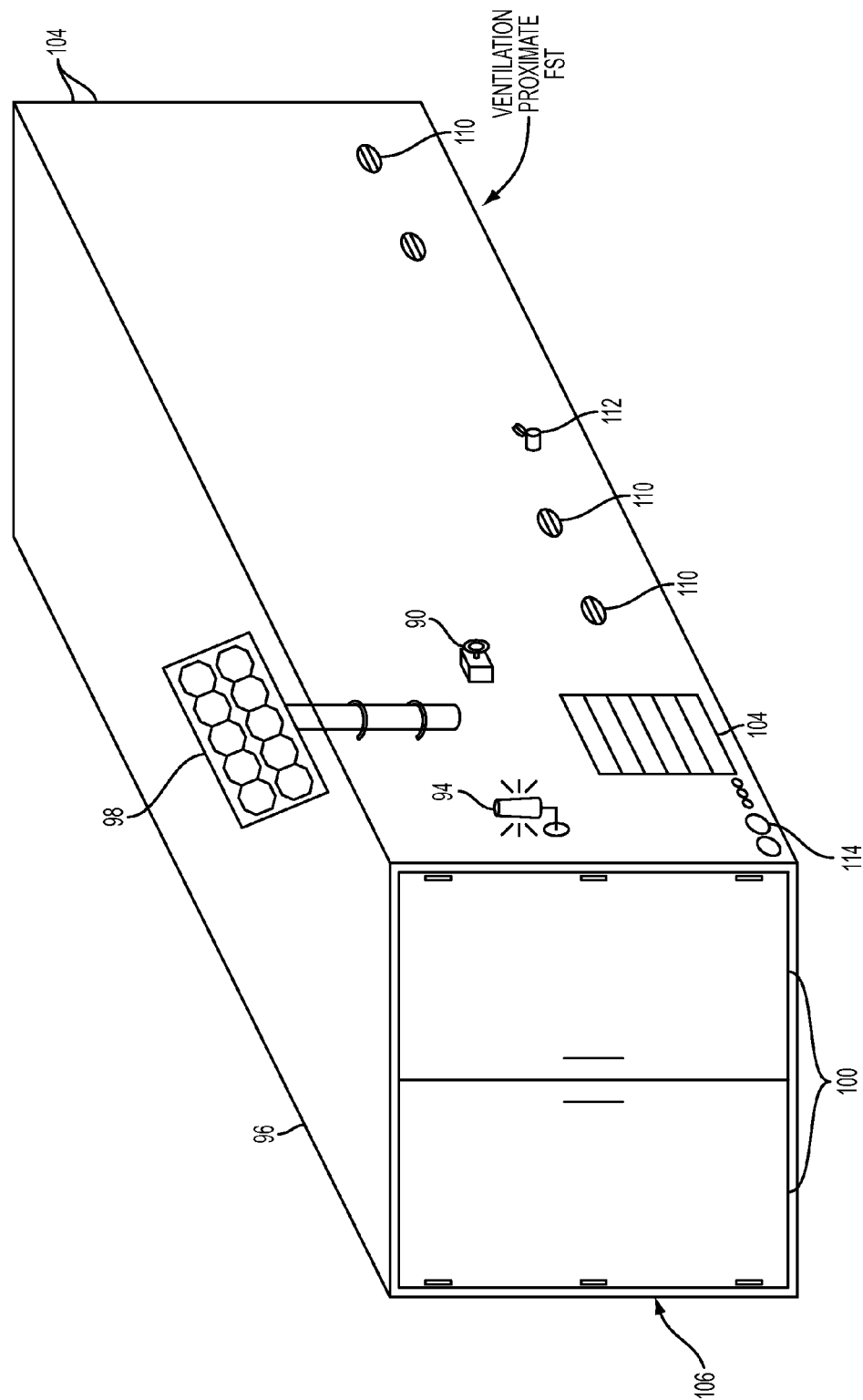
FIG. 6 illustrates an example of a portable, enclosed hydrocarbon vapor recovery system, in accordance with one embodiment of the present invention.

FIG. 6 illustrates another aspect of an embodiment of the present invention, wherein the recovery system 20 is contained in a portable enclosure 96. The enclosure 96 contains the system 20, 22 in a secure manner, protected from the environmental elements (such as wind, rain, snow, etc.) and protected from vandals, wild animals or other disruptions. In one example, the enclosure 96 may be formed from corrugated steel, and may be generally rectangularly shaped with lockable access doors 100 provided on one or more ends or sides. For safety, blast doors can be utilized. The enclosure 96 can be sized to provide an internal volume to house the flexible storage tank 48 (e.g., in a fully inflated state) along with the other components of the system 20, 22. The enclosure 96 can be sized so that it can transported, with the components of the recovery system 20 and oxygen reduction system 22 contained therein, on a flatbed truck for transportation and reuse of the recovery system 20, 22 at another oil/gas production site. In one example, the enclosure 96 may be approximately 40 ft long, 8 ft wide, and 8.5 ft high.

In one example, one or more solar panels 98 can be mounted to the side, end, or the roof of the enclosure 96 in such a way that the solar panel(s) 98 can be rotated 360 degrees, as well as titled from 0 to 90 degrees, to increase solar energy capture as desired, regardless of the position/orientation of the enclosure. The solar panel electrical output connections can be configured as described above with reference to FIG. 5.

A warning beacon light, alarm, or indicator 94 can be attached to the outside of the enclosure 96, and can be used to indicate the presence of an alert such as the presence of explosive gas as detected by the system 20.

An emergency shut down button 90 may be provided on the exterior of the enclosure 96, thereby providing a user with the ability to shut down the system without having to open the doors 100 of the enclosure 96. An emergency shut down button may also be provided on the interior of the enclosure 96, and in one example can be wired in series with external emergency shutdown button 90.

Ventilation 102 can be provided in the enclosure 96, in the form of active ventilation and passive ventilation. In one example, the active ventilation can be created through the use of a pair of opposing dynamic ventilation louvers 104, 106, positioned along the sides of the enclosure proximate the radiator fan of the engine, so that when the fan turns on, air is pushed outwardly to exit the enclosure through a first louver 104, which has the effect of inducing or drawing airflow into the enclosure through the second, opposing louver 106.

In another example, passive ventilation within the enclosure may be provided by the use of fixed louvers 108 along the back end of the enclosure 96, and allow for air to exit the enclosure as the flexible storage tank 48 inflates. Additionally, ventilation openings 110 can be provided along both sides and ends of the enclosure, towards the bottom portion of the sides of the enclosure, if desired, to permit for ventilation of the enclosure 96 and to permit heavier-than-air gases to be ventilated.

Figure 12:
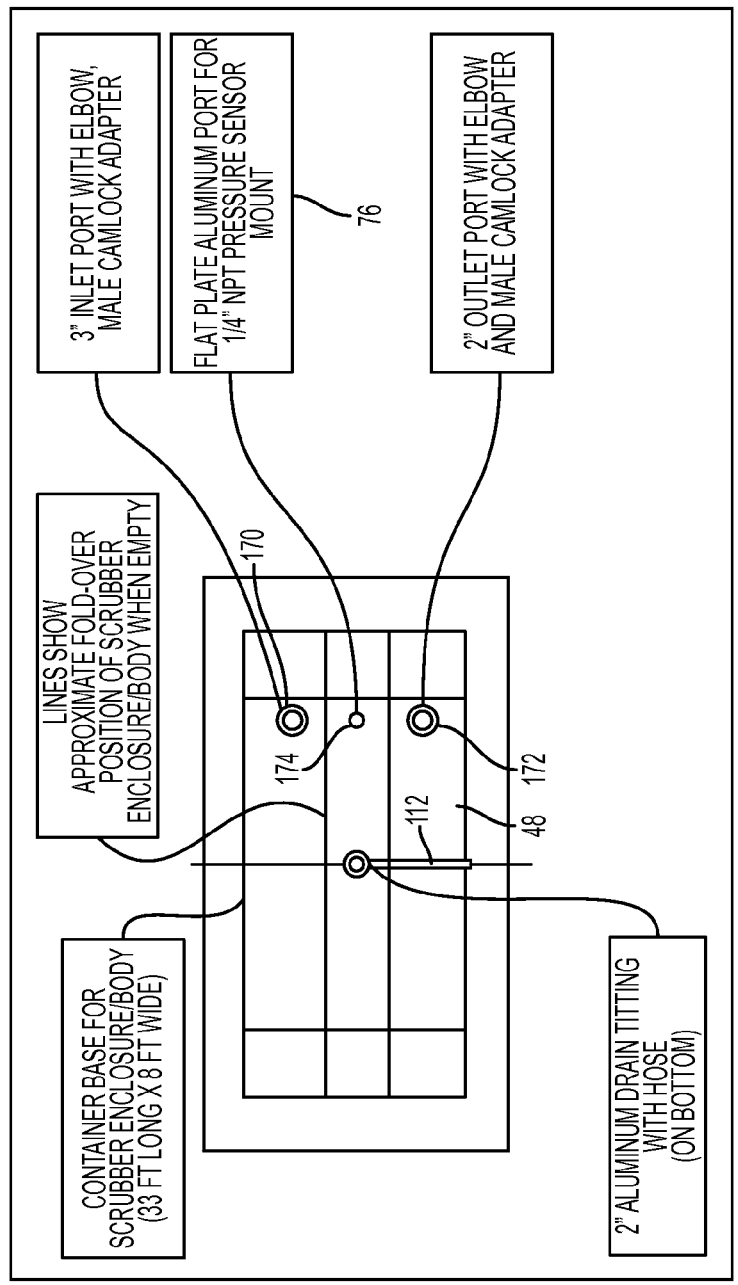
FIG. 12 is a top view a flexible storage tank if deflated, including a vapor inlet, scrubbed vapor outlet, condensate drain valve (on the bottom), and pressure relief sensor, in accordance with an embodiment of the present invention.

The enclosure 96 may also include a pair of angled floor members that sit below the flexible storage tank 48 and in one example, work to bias the flow of the scrubbed liquids in the flexible storage tank 48 to drain to a common center exit drain valve 112 (FIGS. 6 and 12).

The enclosure 96 may also include a plurality of connections 114 that are used to connect the recovery system 20 to external conduits, etc. In one example and as shown in FIG. 6, the connections 114 are positioned proximate to one another in a common section of the enclosure 96, which provides ease of connections of the recovery system 20, 22 to external components/conduits. The plurality of connections 114 may include, for example, a 3 inch conduit for the flash emissions vapor inlet to the recovery system (from the output of the oil condensate storage tanks 26); a 3 inch conduit for flash emissions vapor outlet from the recovery system to the flare 28; 1 inch conduit for receiving fuel/process gas from the separator 36 into the recovery system; 1 inch conduit for connecting the drain of the inter-stage scrubber 64 to the oil condensate storage tank 26; and 1 inch conduit for connecting compressed recovered vapor output 30 of the recovery system 20 and oxygen reduction system 22 with the sales pipeline 24.

Oxygen Reduction Sub-System

The recovery system 20 may also include or be coupled with systems for reducing oxygen content 22 in a stream of combustible gas, such as natural gas. Embodiments of system 22 can be utilized, for instance, for the reduction of the amount of oxygen present in natural gas that is recovered from wells or oil storage tanks, before the recovered natural gas is introduced into the sales line 24 of a natural gas system.

In FIG. 1, an example is illustrated wherein a natural gas vapor recovery system 20 is coupled with or includes an oxygen reduction system or subsystem 22, in accordance with one embodiment of the present invention. In one example, the output of the recovery system 20 provides recovered vapors 72 (i.e., recovered natural gas) which are input into an oxygen reduction system 22. The oxygen reduction system 22 provides an output 30 of recovered vapor having significantly less oxygen than the recovered vapor output 72 of the recovery system 20. In another embodiment, the oxygen reduction system 22 is integrated into or with the recovery system 20, so that a single system provides recovered vapor 30 having an oxygen content at or below permissible levels.

It is understood that embodiments of the present invention, including portions of the systems and processes disclosed herein, can be used to reduce the oxygen content in natural gas across various applications, environments, systems or devices, such as systems other than that as shown in FIG. 1; use with a natural gas recovery system (FIG. 1) is described herein by way of example only.

Figure 7:
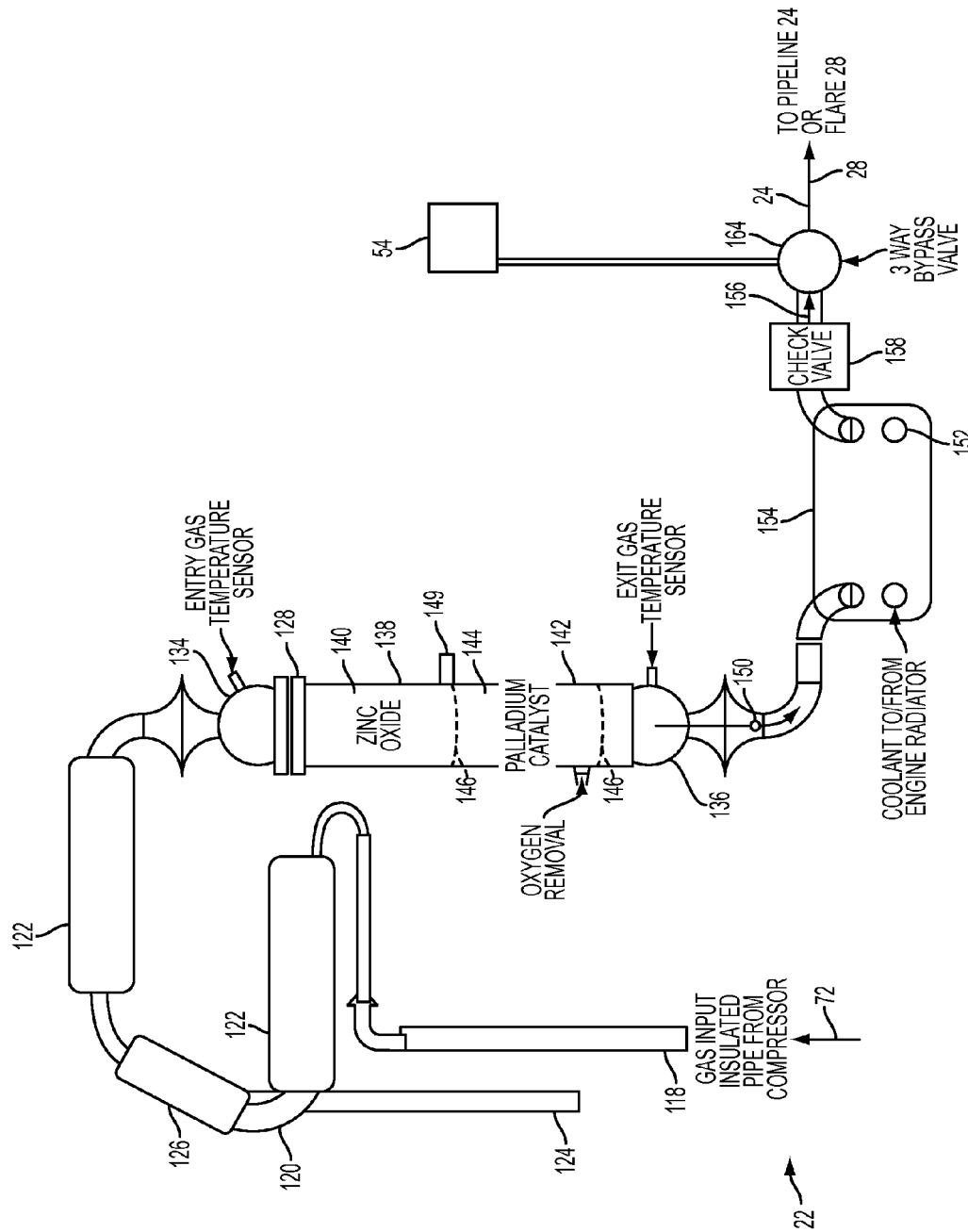
FIG. 7 illustrates an example of a diagram of a system for reducing oxygen in a natural gas stream, in accordance with one embodiment of the present invention.

Referring to FIG. 7, FIG. 7 illustrates a block diagram of one embodiment of a system 22 for reducing oxygen in a recovery system. In one example, the system 22 receives through pipe 118 natural gas 72 that has been recovered from a well (i.e., processed from the second stage compressor 62 of a recovery system 20) and that processed natural gas 72 is preheated by a pre-heating stage 120 which may include one or more catalytic heaters 122 that are adapted to heat the natural gas within the pipe 118 to a desired temperature range. If desired, exhaust 124 from the engine 56 can also be used to provide additional heat transfer by muffler gas exchanger 126 to the natural gas line in the pipe 118. At the output of the catalytic heaters 122, the heated processed natural gas enters into a catalytic pressure vessel 128 (also referred to as a reactor) which combusts oxygen contained in the heated processed natural gas. The resulting processed gas is then directed (shown as 30) to the sales line 24 if the processed gas 30 is within the desired oxygen specification (i.e., below the desired oxygen limit), or if not within specification, diverted away from the sales pipeline to the flare 28 to be incinerated.

Catalytic Heaters and Exhaust Heater

Figure 8:
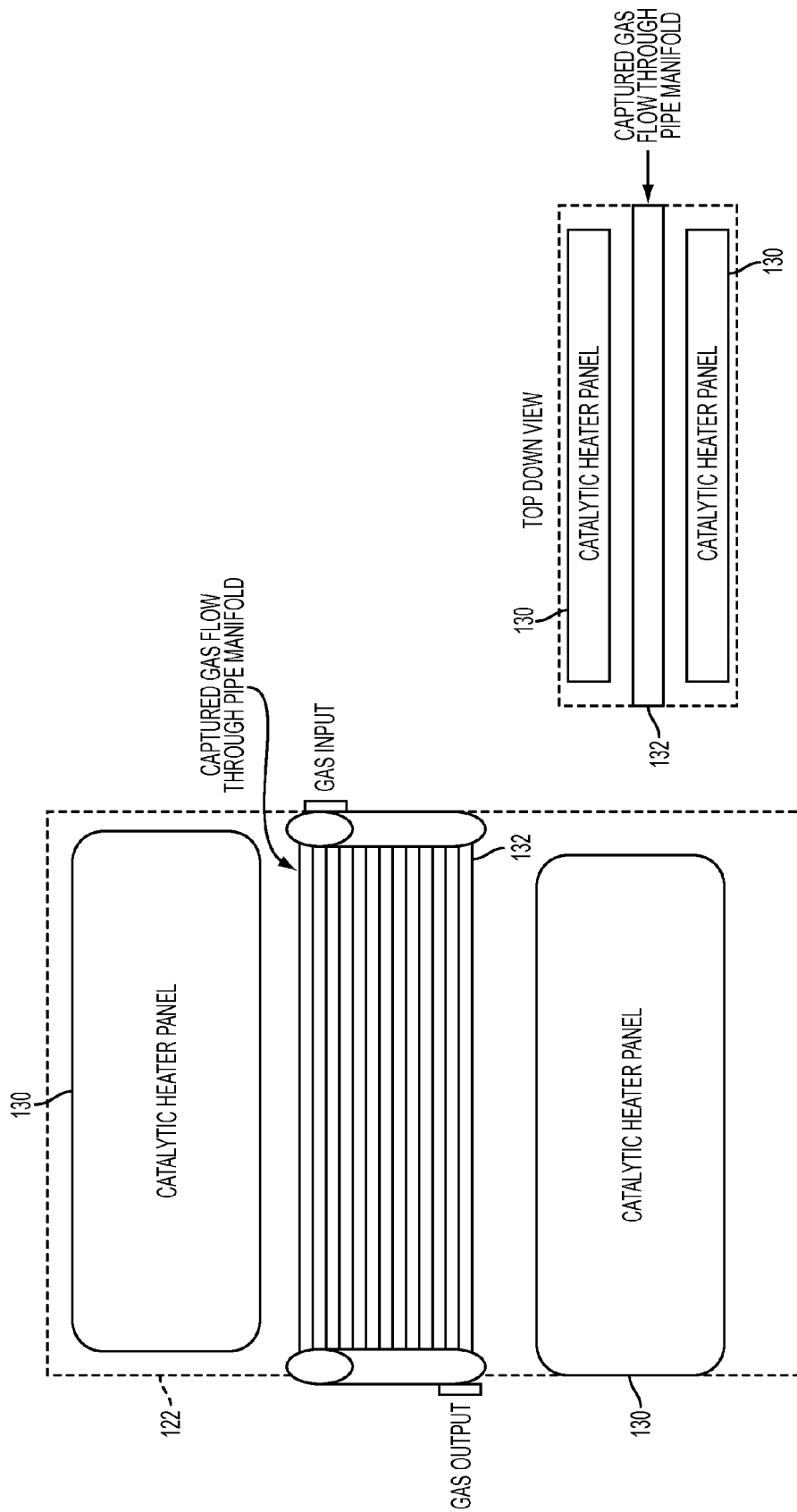
FIG. 8 illustrates an example of a catalytic line heater assembly used to heat a stream of fluid or natural gas, in accordance with one embodiment of the present invention.

In one example and as shown in FIGS. 7-8, each catalytic heater 122 may include two 6 inch by 24 inch catalytic heater panels 130, each at 6,000 BTUs per hour to a total of 12,000 BTUs for each heater, each having a pipe manifold 132 with a 1 inch Schedule-80 pipe on either end, mounted vertically, and six pipes (i.e., ⅜ three-eighths inch pipes) making up the horizontal section to form a ladder structure. One example may include baffles inside of the 1-inch manifolds to direct the gas back and forth. This provides large surface areas, as well as increases the retention time of the processed gas through the heaters, which helps improve the heat transfer into the pipe of natural gas. The first and second heaters 122 may be substantially identical, in one example, and together provide approximately 24,000 BTUs per hour going towards pre-heating the natural gas.

In one example, the catalytic heaters 130 are provided fuel from the separator 36 (and not from the processed gas 72) because gas from the separator 36 typically has a BTU/volume value that is within the operating parameters of certain heaters, which helps protect the catalyst in the catalytic heaters 130 from burning off.

In one example, when the engine 56 of the recovery system 20 is on, the gas from the separator 36 can be run through higher pressure gas regulators located upstream of said heaters 130, which essentially puts more gas through the heaters 130. When the engine 36 turns off, the gas from the separator 36 is directed to lower pressure regulators and, therefore, the temperature goes down inside of the catalytic heaters 130. In this manner, gas is not wasted when the engine 56 turns off (which also means that natural gas 72 is not moving through the system), and when heat is needed as processed natural gas 72 is moving through the system, the heaters 130 are provided with more fuel gas from the separator 36. In one example, the diversion between the low and high pressure sets of regulators of gas from the separator 36 is accomplished through a three-way solenoid valve.

Figure 9:
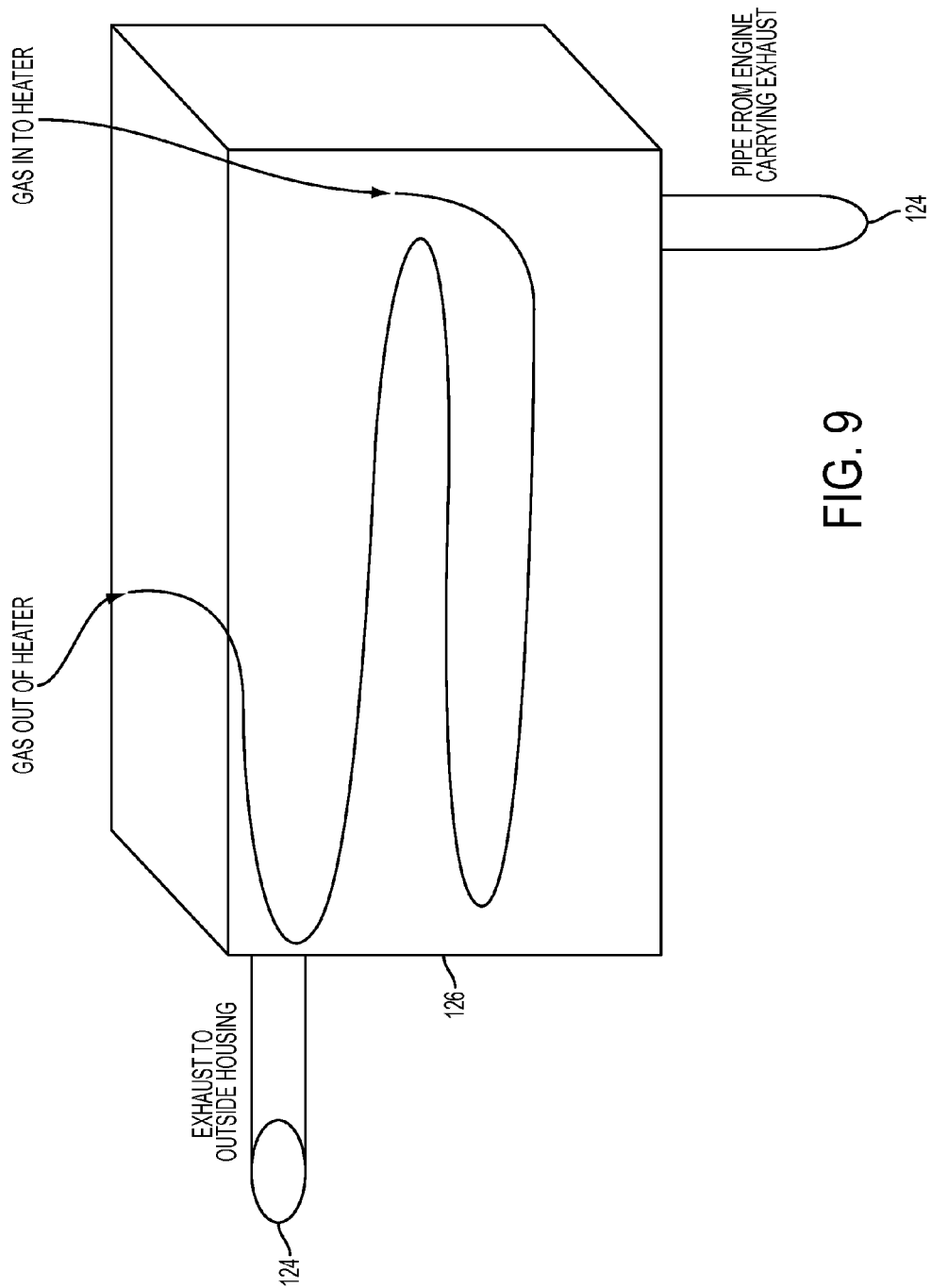
FIG. 9 illustrates an example of a heat exchanger that uses waste heat from an engine's exhaust to heat a stream of fluid or natural gas, in accordance with one embodiment of the present invention.

In one example and as shown in FIGS. 7 and 9, a rectangular box may be provided as a muffler gas exchanger 126 where the exhaust 124 coming out of the engine 56 is directed through the exchanger 126 and essentially bathes the outside of 5 one-inch pipes that run, in series, with the pipe 118 that that the processed gas 72 is contained in. This provides heat transfer from the engine exhaust 124 into the processed gas 72, and the exhaust 124 is then directed outside of the housing.

Pressure Vessel/Reactor

The catalytic pressure vessel 128 (FIG. 7) is generally an elongated, cylindrical pressure vessel in one example, having an input 134 and an output end 136. The catalytic pressure vessel 128 may include a first stage 138 including zinc oxide material 140 (i.e., a bed of zinc oxide) or other material which acts as a sulfur scavenger, and a second stage 142 including a palladium catalyst 144 or other material which operates to lower the activation energy required to facilitate combustion between oxygen and the heated natural gas 72, effectively eliminating the limiting reagent as the heated natural gas 72 passes through the pressure vessel 128 that contains the palladium catalyst 144, at or above a given temperature and pressure. In one example, oxygen is the limiting reagent and the threshold pressure and temperature vary with the composition of the natural gas stream 72. In one example, the reactor 128 is positioned vertically or substantially vertically, so that the natural gas 72 flows downwards through the reactor 128, which essentially packs in the catalytic pebbles 144 and thus reduces the possibility of any channeling of the gas stream. This also ensures contact between the processed natural gas 72 and the materials 140, 144 within the reactor, resulting in the most efficient sulfur removal and reduction of oxygen content.

The bed of zinc oxide 140 is provided which acts as a sulfur scavenger and protects the palladium catalysts 144 in the reactor 128 from the poisoning effects of sulfur. In one example, it is desirable that the palladium catalyst 144 is exposed inside the reactor 128 to less than 0.1 parts per million of sulfur; however, there is the possibility of significant concentrations of sulfur, up to about 20 parts per million, are present in the heated processed natural gas stream 72 in a specific situation or geographical location.

In place of zinc oxide 140, other materials or solutions may be used to remove sulfur from the gas stream, including amine solutions of monoethanolamine (MEA) and diethanolamine (DEA). It is also possible to use solid desiccants like iron sponges or polymeric membranes.

In one example, the zinc oxide bed 140 is placed inside of the reactor 128 on top of the palladium catalyst bed 144. As processed gas 72 enters into the reactor 128 and subsequently travels downward through the reactor, it has to pass through the zinc oxide bed 140 before it gets to the palladium catalyst 144 itself. As the processed heated gas 72 passes through the zinc oxide scavenger bed 140, sulfur molecules are grabbed by the zinc oxide and pulled out of the gas stream 72, as shown in the example reaction:

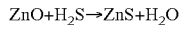

$ZnO + H_2S \rightarrow ZnS + H_2O$

Acting as a sacrificial bed, the zinc oxide bed 140 may be replaced periodically.

A separator screen 146 may be positioned between the zinc oxide material 140 of the first stage 138 and the palladium catalyst 144 of the second stage 142, in order to reduce the amount of movement or mixture of zinc oxide material 140 with palladium material 144.

In place of the palladium catalyst 144, other materials may be used, including platinum or palladium/platinum blends. In another example, materials comprising metals, nickel, cobalt, copper, iron and silver can be used to cause the oxygen present in the gas 72 to react with the metals and reduce the oxygen content in the gas stream 72.

The catalytic pressure vessel 128 includes, in one example, an entry gas temperature sensor 147 on the input side 134 of the catalytic pressure vessel 128. The temperature sensor 147 provides data relating to the temperature of the natural gas 72 as it enters the catalytic pressure vessel 128. The catalytic pressure vessel 128 may also include an exit gas temperature sensor 148, positioned at the output 136 of the catalytic pressure vessel 128, for providing data relating to the temperature of the natural gas 72 as it exits the catalytic pressure vessel 128. A sulfur sensor 149 may also be provided along the catalytic pressure vessel 128, which provides data relating to the amount of sulfur present within the catalytic pressure vessel 128.

The catalytic reactor 128 uses a palladium catalyst 144 to facilitate the combustion of the oxygen with hydrocarbons in the processed stream of natural gas 72 while in the reactor 128. The oxygen in this case is the limiting reagent and is thus burned up once the light-off temperature is achieved within the reactor 128 when the gas 72 is at sufficient temperature and pressure.

The catalytic reaction inside of the reactor 128 eliminating the oxygen is an exothermic reaction. In order to control the temperature rise that occurs within the reactor 128 itself, thermocouples 147, 148 may be used at the inlet and the outlet 134, 136 of the reactor 128 to measure the temperature of the processed gas 72 within the reactor. If the temperature within the reactor 128 goes above a setpoint (i.e., 800° Fahrenheit), in one example the system 20 may be shutdown until the reactor 128 temperature cools down to an acceptable temperature, at which time the system 20 can be re-started (i.e., 700 Fahrenheit).

Having passed through the catalyst pressure vessel 128, the natural gas (shown as 150) has substantially less oxygen content than it had it prior to entry into the system 22.

Cooling System/Output

In one example, a cooling portion (FIGS. 7 and 10) to the system may be provided in order to cool the natural gas 150 after it has been processed by the catalyst pressure vessel 128. A radiator may be provided in conjunction with a plate heat exchanger 154 (such as a conventional plate heat exchanger), so that the gas 150 can be cooled by circulating coolant as well as through mechanical fins and heat transfer.

Figure 10:
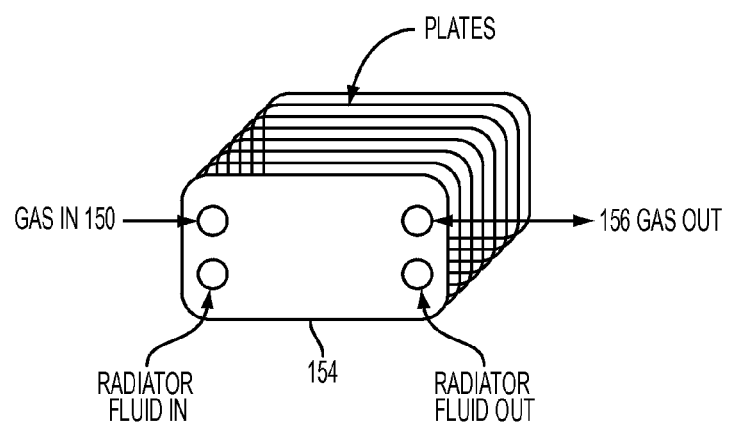
FIG. 10 illustrates an example of a plate heat exchanger that can transfer heat to or from a stream of fluid or natural gas to or from a separate stream of fluid or natural gas, in accordance with one embodiment of the present invention.
Figure 11:
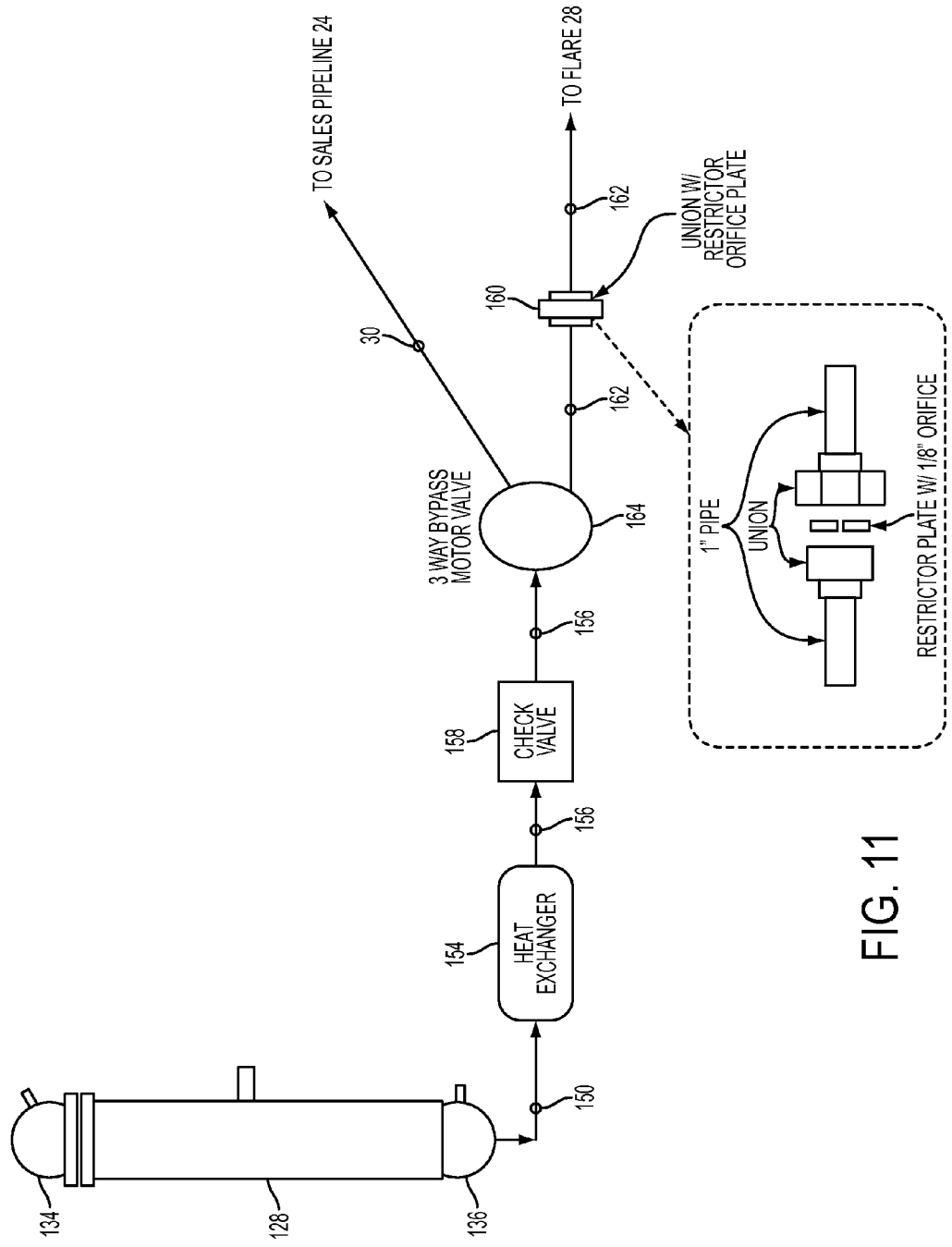
FIG. 11 illustrates an example of a restrictor plate that can restrict the flow of a stream of fluid or natural gas, in accordance with one embodiment of the present invention.

As shown in FIG. 10, in one example, the plate-heat exchanger 154 may have a plurality of plates (i.e., 40 plates), and can utilize a cross-flow method for cooling, wherein the processed gas 150 being the hot side and the engine antifreeze/water coolant mixture as the cold side. The processed gas 150 comes in the top and out the bottom, whereas the coolant comes in the bottom and out the top, again for cross-flow cooling.

The output gas 156 of the plate heat exchanger 154 is cooled compressed recovered gas with reduced oxygen content, and can be coupled into a check valve 158, which prevents natural gas 156 from flowing back into the system. An oxygen sensor 54 is provided at the output of the cooling section, located upstream of said check valve 158 in one example, in order to measure the amount of oxygen (i.e. in parts per million) and relay that data to the controller 50. As described herein, if the oxygen level present within the natural gas 156 is acceptable, then the natural gas 156 is routed to (shown as 30) the sales pipeline 24; and if the oxygen content in the natural gas 156 is out of specification (i.e. unacceptably high) then the natural gas is routed to (shown as 162) the flare 28 to be burned off to the outdoor environment.

In one example, along the line to the flare 28, a restrictor plate 160 (FIG. 11) may be provided which throttles the flow of gas 162 towards the flare 28 to provide a regulated flow amount (as well as regulated pressure) of gas 162 to be fed to the flare 28. In one example, the restrictor plate 160 may result in a pressure drop of 200 psi down to less than one-half of a pound per square inch. The pressure regulation helps keep the outside flares 28 intact and prevents damage to them.

In one example, an acceptable level of oxygen for the output 30 of the system can be dynamically calculated. For instance, the floating point for the O2 specification may be based on radio communications between the production location's master well controller and the controller (PLC) 50 of the recovery system. As an example, the PLC 50 can continuously gather individual flow rates from each well, and the PLC can sum all of the traditional production flow rates and use a quotient of the sum of the flow rates from traditionally producing wells over the compressor's 58 throughput, then add 1 to that quotient to account for the compressor throughput to obtain a ratio of flows. Dividing the oxygen concentration by the flow ratio will result in a blended oxygen concentration entering the sales gas pipeline. In this example, this resulting concentration is used to ensure that the blended oxygen concentration never exceeds the pipeline's oxygen specifications, or else the gas is sent to flare off via a bypass three-way motor valve 164.

Outlet O2 Concentration/((SUM Traditional Well Flow rates/Compressor Throughput)+1)=Blended O2 Concentration In overall operation, the process for removing oxygen from the recovered processed natural gas 72, post-compression includes a pre-heating operation, which may include heating through one or more heaters. For example, the gas may be heated by a first catalytic heater enclosure 122 directed at a multi-run pipe manifold, causing the temperature of the gas 72 to become hotter through each run before it goes into an exhaust heat exchanger 126, back and forth between a plurality (i.e., five) runs—each time getting hotter and hotter each time as it moves back and forth. The gas 72 may then be passed through a second catalytic heater 122, in one example of the invention, to continue to pre-heat the processed gas 72.

The gas 72 then enters the catalyst reactor 128, and within the reactor a flameless exothermic reaction takes place wherein the longest chained/heaviest hydrocarbons (i.e. pentanes, hexanes, heptanes, octanes, or heavier) combust/light off first with the oxygen present in the mixture. Since the reaction is exothermic, the reaction can sustain itself once it hits the activation temperature (i.e., 570 deg. F). The byproducts of this reaction are carbon dioxide and water.

The output 150 of the reactor 128 is then cooled. The cooled gas 156 has fewer hydrocarbons, less oxygen, and some carbon dioxide and water in the stream. In one example, when discharging gas 156/30 into a natural gas gathering pipeline 24 that feeds into a gas processing plant, amine gas treatment units at the inlet of the gas processing plant will dehydrate the stream, thereby removing any water as well as carbon dioxide.

Examples of Flexible Storage Tanks

As described above, a flexible storage tank 48 can be provided in the recovery system 20 to allow varying flow rates of influx vapor 44 to be scrubbed of condensed liquids.

The flexible storage tank functions to capture and scrub (i.e., remove liquids) from vapor emissions 44 associated with natural gas production.

Flash gas vapor streams from oil storage tanks are typically saturated with both liquid hydrocarbons and H20. To avoid premature compression equipment 58 failure due to fouling lubricating oil with these liquids, it is necessary to scrub as many liquids from the stream as possible to "dry" the gas prior to compression.

The flexible storage tank 48 is useful for scrubbing entrained liquid condensate from gaseous streams 44, maintaining a constant pressure at or slightly above atmospheric pressure while allowing various inlet and discharge flow rates. This is especially advantageous when utilized in a vapor recovery scenario with artificial lift production.

In one example, a flexible and deformable enclosure 48 allows condensed liquids to fall out of solution, wherein portions of or the entire enclosure structure 48 remains flexible to allow for partial or entire deformation in order to allow the enclosure's internal pressure to remain at or slightly above ambient pressure, while accommodating varying flow rates of gas 44 into and/or out of the closure 48. The tank 48 includes an inlet 170 for conveying a gaseous stream 44 into said enclosure 48 to be scrubbed; an outlet 172 to exhaust scrubbed vapor; a valve-controlled drain 112 for emptying the flexible storage tank enclosure 48 of accumulated liquids; and a pressure relief valve 92 located upstream of, directly mounted to, or downstream of the flexible storage tank enclosure 48 with an appropriate set point for pressure relief as flexible material used in construction has a much lower maximum allowable working pressure (MAWP) than rigid material.

The inlet and outlet 170, 172 are attached to the topside of the flexible storage tank body 48 while the drain connection 112 is located at the lowest point on the bottom side of tank 48.

Gas streams that enter the flexible storage tank 48 experience a sudden drop in velocity due to the significant increase in cross-sectional area between the gas inlet 170 and outlet 172. This gives the vapor stream sufficient settling time for any liquid condensate entrained in the gas stream 44 to fall out of solution via gravitational forces. This happens at or slightly above ambient pressure, as the vapor is "produced" at these low pressures.

The flexible storage tank 48 allows for an expandable internal volume while maintaining a constant pressure. When utilized in a vapor recovery application, it allows flash tank vapors 44 to accrue within its flexible structure, until the downstream compressor 58 evacuates the collected gas. This prevents an overloading condition for the vapor recovery compressor 58 and allows the compression equipment 58 to run longer maximizing compressor capacity.

A control system 50 that monitors the fill level of the flexible storage tank 48 can be used to govern the operation of the compressor 58 to evacuate the collected scrubbed vapor.

The flexible storage tank 48 provides a mechanism for removal of entrained condensed liquids from varying flow rates of influx vapor streams 44 at or slightly above atmospheric pressure. As liquids are considered incompressible, it is important that they do not enter compression equipment 58. By removing liquids from typically saturated gas streams 44, the flexible storage tank 48 allows dry vapor produced from sources at or slightly above atmospheric pressure, to be safely compressed without damage to compression equipment 58 due to liquid intake.

The flexible storage tank scrubs entrained liquid from vapor streams 44. The liquids fall to the floor of the flexible storage tank enclosure 48, where they collect until drained from the condensate drain 112 referenced in FIG. 12. A floor that sloped towards the condensate drain 112 collection point assists in scrubbed liquids collection and drainage.

Traditional scrubbers remove unwanted components from a process stream inside of an enclosure with a fixed volume; as a result, internal pressure varies with material input. The flexible storage tank 48 allows the scrubbing process to take place at, or slightly above, ambient pressure despite potentially varying flow rates by utilizing a non-rigid enclosure that expands with material input, increasing the internal volume of the flexible storage tank enclosure 48. This allows for a nearly constant internal pressure until the expandable flexible storage tank enclosure 48 is completely filled, at which point internal pressure will rise. In one example, the average inlet flow rate may be, for example, 125 cubic feet per minute, which can typically last for 10 minutes. Accordingly, the flexible storage tank enclosure may have, in one example, an internal volume of over 1900 cubic feet to ensure it will not reach capacity.

When sized correctly for a specific process, the flexible storage tank 48 can accommodate varying or intermittent discharge flow rates without venting from a pressure relief valve. However, when sizing a flexible storage tank 48 for an unpredictable process with potential or confirmed flow rate spikes, a pressure relief valve 92 can be used due to the flexible nature of the tank's construction. Flexible materials that comprise the flexible storage tank enclosure are inherently weaker than rigid materials and cannot maintain integrity when internal pressure rises above the maximum allowable working pressure for which the flexible storage tank is designed. Internal volume capacity is another factor in determining maximum allowable working pressure. A pressure relief valve 92 can be installed either directly on the flexible storage tank enclosure, or immediately upstream of the vapor inlet.

The construction of the flexible storage tank is such that it will remain "air-tight" without any possibility of leakage at pressures up to the maximum allowable working pressure. The pressure relief valve 92 vents at pressures lower than the maximum allowable working pressure to vent vapor 44 from inside the flexible storage tank enclosure 48 and prevent rupture. In one example, the pressure relief valve 92 begins to vent at three quarters of the maximum allowable working pressure of the flexible storage tank 48.

Materials that may contact the vapor 44 should be compatible with the vapor stream 44. In one example, a PVC alloy coated polyester fabric is used for the flexible storage tank 48 to provide chemical and abrasion resistance. The material used is unreactive with the intended hydrocarbon vapor stream 44.

The flexible material used to construct the flexible storage tank can also be selected to withstand the range of temperatures it will experience in a year-round, outdoor environment. Subsequently, the material's operating range could be from −40° F. to 140° F., in one example.

Inlets 170 and outlets 172 are sized based on the specific process to be scrubbed in order to allow sufficient flow rates at nearly atmospheric pressures. In one example, a 3" inlet 170 may be used in the flexible storage tank 48 to allow over 200 cubic feet per minute of hydrocarbon vapor 44 with a specific gravity of 1.0 with a pressure differential of 8 ounces per square inch to enter the flexible storage tank. A 2" outlet 172 may be used to convey scrubbed hydrocarbon vapor to compressor 58. The locations and sizes of the inlet 170 and outlet 172 are shown in FIG. 12.

As shown in FIG. 12, a ¼" NPT port 174 for a pressure sensor 76 is included in one example of a flexible storage tank. A pressure sensor 76 allows outside process controls to stop or divert the influx of vapor 44 when a high-pressure set point has been reached. This pressure based vapor diversion set point is programmed to occur at a lower than the pressure relief valve 92 set point. This prevents unnecessary stress on the flexible storage tank 48. If the pressure sensor based inlet vapor diversion should fail for any reason, the pressure relief valve 92 serves as a backup against overpressure and subsequent flexible storage tank enclosure rupture.

Figure 13:
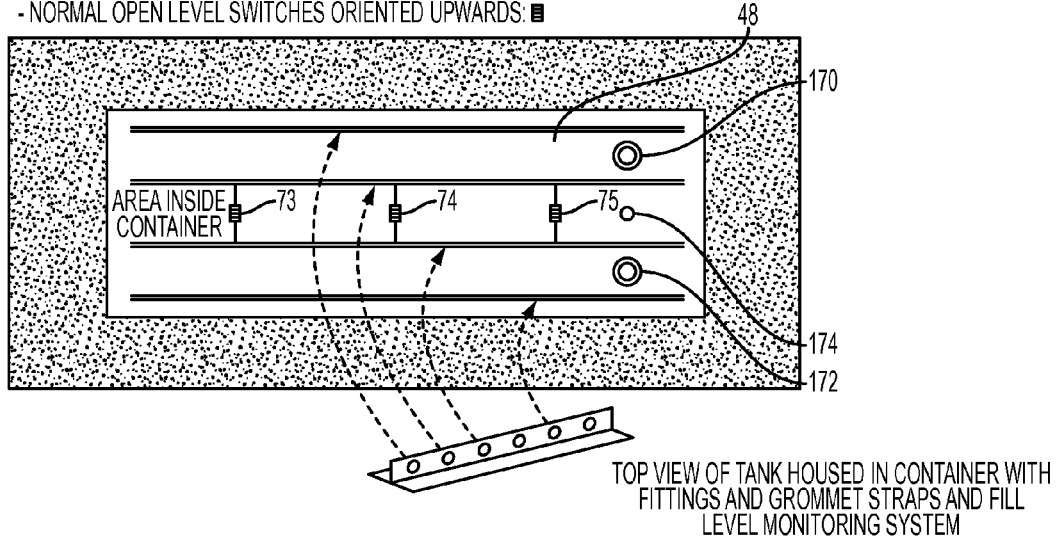
FIG. 13 is a top view of a flexible storage tank that shows possible locations of grommet straps, along the topside of the flexible storage tank, that can be used as attachment points for devices that monitor the flexible storage tanks fill level, in accordance with one embodiment of the present invention.

Shown in FIG. 13, a control system that monitors the fill level of the flexible storage tank 48 can be used to govern the operation of the compressor. In one embodiment, three level switches 73-75, mounted upright and wired in series in a normal open configuration, are used to monitor the flexible storage tank fill level. The series circuit of normal open level switches is powered by a voltage source, and in one example, only when every switch is pulled down by the weight of the flexible storage tank does the circuit complete, indicating to controller 50, that the tank 48 is empty. In this embodiment, the controller 50 will shut off the compressor 58. If any one of the level switches opens due to a rise in the fill level of the flexible storage tank 48 via vapor 44 influx into the flexible storage tank 48, the circuit is broken, indicating that the vapor fill level of the flexible storage tank 48 is rising, and the controller detects this and will turn on the compressor 58 to evacuate the flexible storage tank 48 of scrubbed vapor.

The compressor 58 evacuates scrubbed vapor from the flexible storage tank 48 and significantly increases the pressure of the vapor for injection into sales gas gathering lines 24, where typical pressures are above 150 psig.

Figure 14:
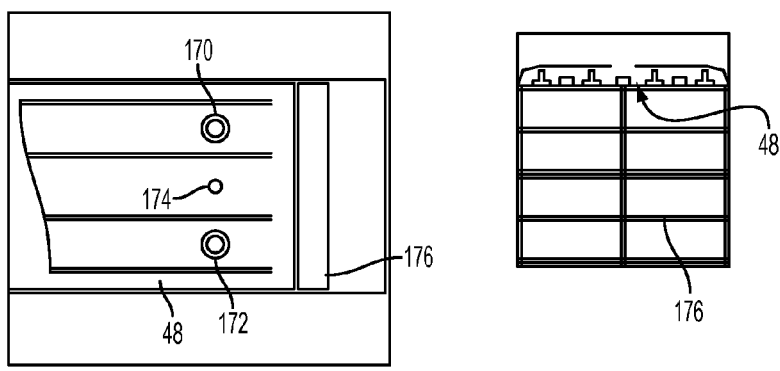
FIG. 14 shows a front view of a flexible storage tank, housed in a shipping container using a bulkhead, in accordance with one embodiment of the present invention.

As shown in FIG. 14, in one example of the invention, a 40-foot container 96 (i.e., a Connex Box, ISO Container) is used to support, house and protect the vapor recovery system from the environment, weather, wildlife, and vandalism. Sidewalls contain and control the expansion of the flexible storage tank 48 to an upward direction, allowing for a higher degree of accuracy when monitoring the flexible storage tank fill level.

When the filled flexible storage tank's length is not as long as the length of the container, a bulkhead 176 can be put in place to form an artificial containment wall as shown in FIG. 14. In this embodiment, the bulkhead 176 supports the side of the flexible storage tank 48 closest to the container's doors 100. A bulkhead 176 can be placed anywhere along the length of the container 96, allowing for variable sizes of flexible storage tanks to be housed in a given container 96.

It is recognized that many modifications may be implemented with respect to the described embodiments of the invention. While a hydrocarbon vapor scrubbing system utilizing a compressor 58 is illustrated, in other embodiments other means of evacuation may be used, including a blower. While normal open level switches 73-75 wired in series are used to monitor flexible storage tank fill level herein, other embodiments may use a plurality of other methods of fill level monitoring, such as ultrasonic devices. While a 40-foot shipping container 96 is used for the support, containment, and protection of the flexible storage tank 48, other embodiments may use other methods, such as a concrete structure, a cylindrical tank, or none at all. Specifically, the described examples may use a 3" outlet and a 2" inlet with a 1900 cubic foot capacity, many other configurations are possible for a wide variety of applications.

Example of Overall Operations

Examples of overall operations for an embodiment of the present invention will now be described. It is understood that embodiments of the present invention may incorporate one or more features, functions, or structures described herein.

Initially, the controller 50 is actively monitoring the oxygen concentration levels in the flash emissions vapor stream 44 from the oil condensate storage tank 26. If the oxygen level in the flash emission vapor stream 44 is above a threshold (e.g., 1%), the flash emissions vapor 44 is passed through the 3-way valve 70 to be burned in the external on-site flare 28. Once the oxygen level is detected to be below the threshold, the controller 50 activates the 3-way valve 70 to divert the flash emissions vapor 44 into the flexible storage tank 48.

Monitoring of the amount of fill of the flexible storage tank 48, along with monitoring and controlling the engine 36 and compressor 58, can be achieved in one example through the use of a series of 3 normally open level limit switches 73-75, each mounted at one end to the ceiling of the enclosure and connected on the other end via cables to the top surface of the flexible storage tank 48, along the length of the flexible storage tank, in conjunction with logic in the controller 50 to activate/deactivate the onboard engine 56/compressor 58 based on the state or position of the limit switches 73-75.

The flexible storage tank 40 fills with vent gas 44, and the controller 50 detects that the flexible storage tank has filled to a limit or setpoint. As vapor 44 fills the flexible storage tank 48 and the top surface of the flexible storage tank rises, the weight of the flexible storage tank is removed from one or more of the limit switches 73-75. When one of the switches returns to its normal open state, the circuit is broken, indicating to the controller 50 that the flexible storage tank is full or filling. This starts a separate timer (e.g., approx. 5 seconds to 10 minutes). This timer's length may be selected based on site-specific production characteristics, but once it runs out, a fuel gas solenoid is opened and seconds later (e.g., 2 seconds), a voltage is applied to the engine 56 starter motor, and an ignition voltage is applied to start the engine.

In one example, the engine is a 3-cylinder natural gas powered reciprocating engine (e.g., a Kubota engine drive), which is fluidly coupled with the separator 36 to receive fuel (natural gas). In one example, the compressor 58 is a two stage reciprocating unit (e.g., Blackmer) directly driven from the engine 56 with a belt. This allows the system 20 to compress gas from a 0 psig suction pressure to over 300 psig at the 2nd stage compressor 62 discharge. An inter-stage liquids scrubber 64 can be provided between the first and second stage of the compressor. Preferably, no inter-stage cooler is used, in order to reduce the formation of liquids in the compressed gas output by keeping the compressed vapor as hot as possible while handling the liquids that do form by collecting them in the inter-stage scrubber 64 and sending them back to the oil condensate storage tanks 26. The compressor 58 uses unloader valves to minimize the parasitic load on the engine 56 during startup so that during startup while the compressor is turning, no gas is being compressed.

After approximately a time period of 45 sec to 2 minutes, in one example (user defined, and may be dependant on the time of year), the unloader valves are de-energized and the compressor 58 begins compressing recovered vapor 44.

As the compressor 58 evacuates the flexible storage tank 48, the dry weight of the flexible storage tank pulls down the limit switches 73-75. When all switches are pulled (i.e., all limit switches are pulled down), a circuit is completed that indicates to the controller 50 that the flexible storage tank 48 is empty. This triggers a timer (e.g., 90 seconds). When the timer runs out, the ignition voltage to the engine 56 is cut off, deactivating the engine 56 and compressor 58, which therefore no longer evacuate vapor from the flexible storage tank 48.

If there are more flash emission vapors 44 in the oil condensate storage tank 26, and assuming that the oxygen level is below the threshold, these vapors 44 fill the flexible storage tank 48 and the process repeats, thereby creating recovered vapor 72 from vent gas/flash emissions vapor 44, and sending the recovered vapor 72 to the oxygen reduction system 22. Throughout the recovery process, in one example the gas blanket 66 is employed under the control of the controller 50 as needed, and the various safety measures described herein are also monitored and employed as needed.

One example of cycles of the recovery system 20 is as follows. After the oil is removed from the oil condensate storage tank 26 by an oil hauler or pumper through the valves and hatch opening 27 of the oil condensate storage tank 26, and the tank hatch and valves are closed and remain undisturbed, the tank will initially contain air/oxygen. As the production well plunger brings oil/gas to the surface and into the separator 36, flash emissions 44 are created in the oil condensate storage tank 26 that are contaminated with oxygen/air during this initial phase.

The recovery system 20 detects the contaminated flash emissions 44, and sends them to be incinerated by the flare 28. For this batch of flash emissions 44, no recovery takes place due to the high concentration levels of oxygen/air in the flash emissions 44. Depending on the implementation, the next one or more batches of oil/gas brought to the surface may also generate contaminated flash emissions 44 that will be incinerated by the flare 28.

Once the recovery system 20 detects that the flash emission vapors 44 are not contaminated with oxygen/air, then the recovery system 20 will recover all or substantially all of the natural gas/hydrocarbons from numerous batches of flash emission 44, until the time when the oil hauler or pumper opens the oil condensate storage tank hatch/valves 27-29 and re-introduces air/oxygen into the oil condensate storage tanks 26 day(s) later. Hence, the recovery system 20 can recover—over a period of days—substantial amounts of natural gas/hydrocarbons from uncontaminated flash emissions 44 created by numerous batches of oil/gas generated at the well 34 as the oil condensate storage tank 26 is filled with condensate—until the next time that oxygen/air is introduced into the oil condensate storage tanks, upon which the recovery system 20 repeats the process described above.

Stated differently, embodiments of the present invention may implement one or more of the following operations. The well 34 pumps a hydrocarbon liquid/gas mix through a separator 36, which removes some lighter hydrocarbon gas (sent to a gas delivery pipeline 24) and sends the remaining liquid 42 (a mixture of oil/gas/water) into oil storage tanks 26. The sudden pressure drop (to atmospheric pressure) causes natural gas and natural gas liquids to flash into a gas 44.

The system 20 monitors the pressure of the oil tanks 26, keeping a slight positive pressure in the tanks. When a pressure drop is noted (due for example to oil collection occurring or the opening of a thief hatch of the oil storage tank) the system 20 initiates a gas blanket 66 to minimize the amount of oxygen let into the tanks 26, and to allow an oil pump-out with a closed hatch 27.

When the gas 44 exceeds a predetermined pressure in the oil tanks 26, it passes into the system 20. In the system, the gas 44 first is sent into an Oxygen Monitor 52 to test for Oxygen. In one example, if oxygen is over 2%, the gas 44 is sent to a burner 28 for combustion, otherwise it is sent to the flexible storage tank 48 (FST).

The flexible storage tank 48 acts as a first stage scrubber of liquids, as a shock absorber to reduce sudden oil tank pressure increase, and allows a reserve of gas 44 to be held to smooth system operations, essentially minimizing starts and stops of the system 20.

When the gas 44 reaches an appropriate level in the flexible storage tank 48, the controller 50 (PLC) gets a signal, and starts the engine 56 which drives the compressor 58.

The gas 44 is sent from the flexible storage tank 48 through a two stage compressor 58 to get the gas up to the line pressure of the delivery pipeline 24.

The recovered gas 72 is then pumped through a heating system including in one example a catalytic line heater, a muffler exchange heater, and a second catalytic line heater to heat the gas to a temperature that will initiate the cleaning reaction in a reactor 128. A ladder heater system can be used to increase the amount of time the recovered gas 72 spends in the heating system.

The heated gas leaves the heating system and enters the reactor vessel 128, and is first cleaned of sulfur (in one example, using a zinc oxide bed).

After passing through the zinc oxide, the heated gas is cleaned of oxygen (in one example, using palladium, platinum, or mix of the two).

The resulting gas 150 has a reduced oxygen content, and exits the reactor 128 and enters a plate heat exchanger 154 to cool. The plate heat exchanger 154 is cooled via fluid from the engine 56 radiator.

After cooling, the gas 156 is sent into a second oxygen monitor 54. If the gas 156 has an acceptable oxygen PPM, it is sent through a v-cone meter 46 to measure volume (i.e., using a conventional TotalFlow computer), then into delivery pipeline 24. Periodic measurements are also taken of gas composition. If the oxygen PPM is too high, the gas 156 is diverted to a flare/burner 28 and is incinerated.

The entire process can be monitored throughout for safety and operational efficiency. Various real-time safety checks can be performed and can automatically shut down the system 20 and divert the gas to a flare/burner 28 if needed. Remote monitoring of gas volume, system shutdowns, oxygen PPM, LEL, and temperature and pressure readings of all systems are handled by the PLC 50. Communication through a wireless network allows remote monitoring and operational messages to be sent via text/email to notify personnel or staff, as desired. Operational performance may be captured in time slices (i.e., down to 1 minute or less), and can be captured and stored in a file storage device on the PLC 50.

Hence, it can be seen that various embodiments of systems and processes for recovering natural gas and reducing oxygen in the recovered natural gas are provided herein. Use of embodiments of the present invention has resulted in the output of the system 22 providing recovered natural gas with less than 0.00 PPM oxygen.

While embodiments of the invention have been described with reference to natural gas gathering pipeline systems, it will be understood that one or more features of embodiments of the present invention can be used to reduce the oxygen content of natural gas streams, recovered natural gas streams, oil condensate storage tank vapors, or other gas streams.

The output of embodiments of the invention can be used to provide natural gas, in gaseous or liquid form, and can be used as an energy source, as a purified fuel source for on-site or off-site equipment, as fuel for refrigeration processes or other processes, as fuel in other uses where corrosion due to oxidation is a concern, or as fuel for other systems or environments where natural gas or liquefied natural gas is used.

It is understood that the specific dimensions, values, and thresholds disclosed herein are provided as examples, and that embodiments of the present invention may be formed using other sizes or dimensions of the components without departing from the teachings herein.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations are not a limitation of the present invention.

It should be appreciated that reference throughout this specification to "one embodiment" or "an embodiment" or "one example" or "an example" means that a particular feature, structure or characteristic described in connection with the embodiment may be included, if desired, in at least one embodiment of the present invention. Therefore, it should be appreciated that two or more references to "an embodiment" or "one embodiment" or "an alternative embodiment" or "one example" or "an example" in various portions of this specification are not necessarily all referring to the same embodiment.

It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. Inventive aspects lie in less than all features of a single foregoing disclosed embodiment, and each embodiment described herein may contain more than one inventive feature.

While the invention has been particularly shown and described with reference to embodiments thereof, it will be understood by those skilled in the art that various other changes in the form and details may be made without departing from the spirit and scope of the invention.

The invention claimed is:

1. A system for recovering flash gas from an oil storage tank, comprising:
   a flexible storage tank that receives the flash gas and temporarily stores the flash gas;
   a compressor having an input receiving the flash gas from the flexible storage tank, the compressor compressing the flash gas to form compressed gas; and
   an oxygen reduction subsystem receiving the compressed gas, the oxygen reduction subsystem reducing an amount of oxygen from the compressed gas.

2. The system of claim 1, wherein the flexible storage tank scrubs liquids from the flash gas.

3. The system of claim 1, wherein the flexible storage tank has a drain located near a bottom of the flexible storage tank, and liquids scrubbed from the flash gas flow out the drain.

4. The system of claim 3, wherein liquids accumulate in the lower portion of the flexible storage tank and flow out the drain.

5. The system of claim 3, wherein the drain has a valve that is adapted to be maintained in a normally closed position.

6. The system of claim 1, wherein the flexible storage tank is made of deformable material.

7. The system of claim 1, further comprising:
   a pressure relief valve coupled with the flexible storage tank for releasing flash gas from the flexible storage tank when the pressure inside the flexible storage tank exceeds a limit.

8. The system of claim 1, wherein the compressor is a two-stage compressor.

9. The system of claim 8, further comprising a scrubber connected between the first stage and the second stage of the compressor.

10. The system of claim 1, wherein the oxygen reduction subsystem further comprises:
   a pipe fluidly coupled with an output of the compressor to receive the compressed gas;
   one or more heaters adjacent to the perimeter of the pipe, said heaters heating the compressed gas inside the pipe; and
   a vessel having an input and an output, the input receiving the heated compressed gas, wherein the vessel contains an oxygen reducing catalyst that reduces the oxygen content of the heated compressed gas.

11. The system of claim 10, wherein the vessel contains a first section and a second section adapted to receive the heated compressed gas as it passes through the first section and second sections in sequence, the first section housing a material to remove sulfur from the heated compressed gas.

12. The system of claim 11, wherein the material to remove sulfur includes zinc oxide.

13. The system of claim 11, wherein the second section includes the oxygen reducing catalyst.

14. The system of claim 10, wherein the oxygen reducing catalyst includes palladium.

15. The system of claim 10, further comprising:
   a heat exchanger coupled with the output of the vessel, the heat exchanger cooling the heated compressed gas to form cooled compressed gas.

16. The system of claim 15, further comprising:
   a check valve coupled with an output of the heat exchanger, the check valve preventing flow of the cooled compressed gas back into the heat exchanger.

17. The system of claim 16, further comprising:
   an oxygen sensor;
   a three-way valve having an input coupled with an output of the check valve, the three-way valve having a first output coupled with a gas pipeline, and a second output coupled with a flare to burn off the cooled compressed gas; and
   logic for controlling the three-way valve, the logic receives data from the oxygen sensor relating to the oxygen content of the cooled compressed gas.

18. The system of claim 17, wherein the logic determines if the cooled compressed gas contains an amount of oxygen in excess of an oxygen-content specification, and if so, the logic activates the three-way valve to divert the cooled compressed gas to the flare for burn-off into the atmosphere.

19. The system of claim 17, wherein the logic determines if the cooled compressed gas contains an amount of oxygen in compliance with an oxygen-content specification and if so, said logic activates the three-way valve to direct the cooled compressed gas to the gas pipeline.

\* \* \* \* \*